(12) United States Patent
Haigermoser et al.

(10) Patent No.: US 11,097,463 B2
(45) Date of Patent: Aug. 24, 2021

(54) DEVICE FOR THE UNIAXIAL OR BIAXIAL STRETCHING OF PLASTICS MATERIAL PORTIONS

(71) Applicant: Brückner Maschinenbau GmbH & Co. KG, Siegsdorf (DE)

(72) Inventors: Thomas Haigermoser, Saalfelden (AT); Christian Heintel, Traunstein (DE); Michael Baumeister, Troisdorf (DE)

(73) Assignee: BRÜCKNER MASCHINENBAU GMBH & CO. KG, Siegsdorf (DE)

( * ) Notice: Subject to any disclaimer, the term of this patent is extended or adjusted under 35 U.S.C. 154(b) by 328 days.

(21) Appl. No.: 16/253,695

(22) Filed: Jan. 22, 2019

(65) Prior Publication Data
US 2019/0224906 A1   Jul. 25, 2019

(30) Foreign Application Priority Data
Jan. 23, 2018   (DE) .................... 10 2018 101 455.4

(51) Int. Cl.
*B29C 55/16* (2006.01)
*B29C 55/20* (2006.01)
*B29C 55/04* (2006.01)

(52) U.S. Cl.
CPC ............ *B29C 55/165* (2013.01); *B29C 55/04* (2013.01); *B29C 55/20* (2013.01)

(58) Field of Classification Search
CPC ......... B29C 55/04; B29C 55/12; B29C 55/14; B29C 55/143; B29C 55/146; B29C 55/16; B29C 55/165; B29C 55/20
See application file for complete search history.

(56) References Cited

U.S. PATENT DOCUMENTS 2,759,217 A  *  8/1956  Peterson ................. B29C 55/10
                                                                     38/102.4
3,635,640 A      1/1972  Wood
(Continued)

FOREIGN PATENT DOCUMENTS

CN       102802919       11/2012
CN       105705314        6/2016
(Continued)

OTHER PUBLICATIONS

Search Report issued in EP Appln. No. 20158403.4 dated Apr. 29, 2020.

*Primary Examiner* — Xiao S Zhao
*Assistant Examiner* — Joseph S Leyson
(74) *Attorney, Agent, or Firm* — Nixon & Vanderhye P.C.

(57) ABSTRACT

An improved device for the uniaxial or biaxial stretching of plastics material portions. The device includes a stretching frame with two pairs of mutually perpendicular guide rails with clips for stretching a plastics material portion, which clips are movable away from or towards each other. The device is constructed such that in addition to the starting position at the beginning of a stretching process and the end position after performing a stretching process, the guide rails and thus the clips seated thereon are additionally movable into a loading position. The loading position is arranged so that it lies asymmetrically within the stretching frame and is thus closer to at least one longitudinal side of the stretching frame than to the opposite side of the stretching frame.

13 Claims, 23 Drawing Sheets

(56) References Cited

U.S. PATENT DOCUMENTS

| | | | | |
|---|---|---|---|---|
| 5,321,109 | A * | 6/1994 | Bosse | B29C 55/10 |
| | | | | 428/910 |
| 8,641,408 | B2 * | 2/2014 | Collin | B29C 55/20 |
| | | | | 425/397 |
| 2005/0211387 | A1 * | 9/2005 | Suzuki | B29C 55/14 |
| | | | | 156/382 |

FOREIGN PATENT DOCUMENTS

| | | |
|---|---|---|
| CN | 106239887 | 12/2016 |
| DE | 1 928 734 | 12/1965 |
| DE | 10 2009 003 751 | 10/2010 |
| JP | 2011-240581 | 12/2011 |
| KR | 10-1082266 | 11/2011 |
| KR | 10-1556246 | 9/2015 |

\* cited by examiner

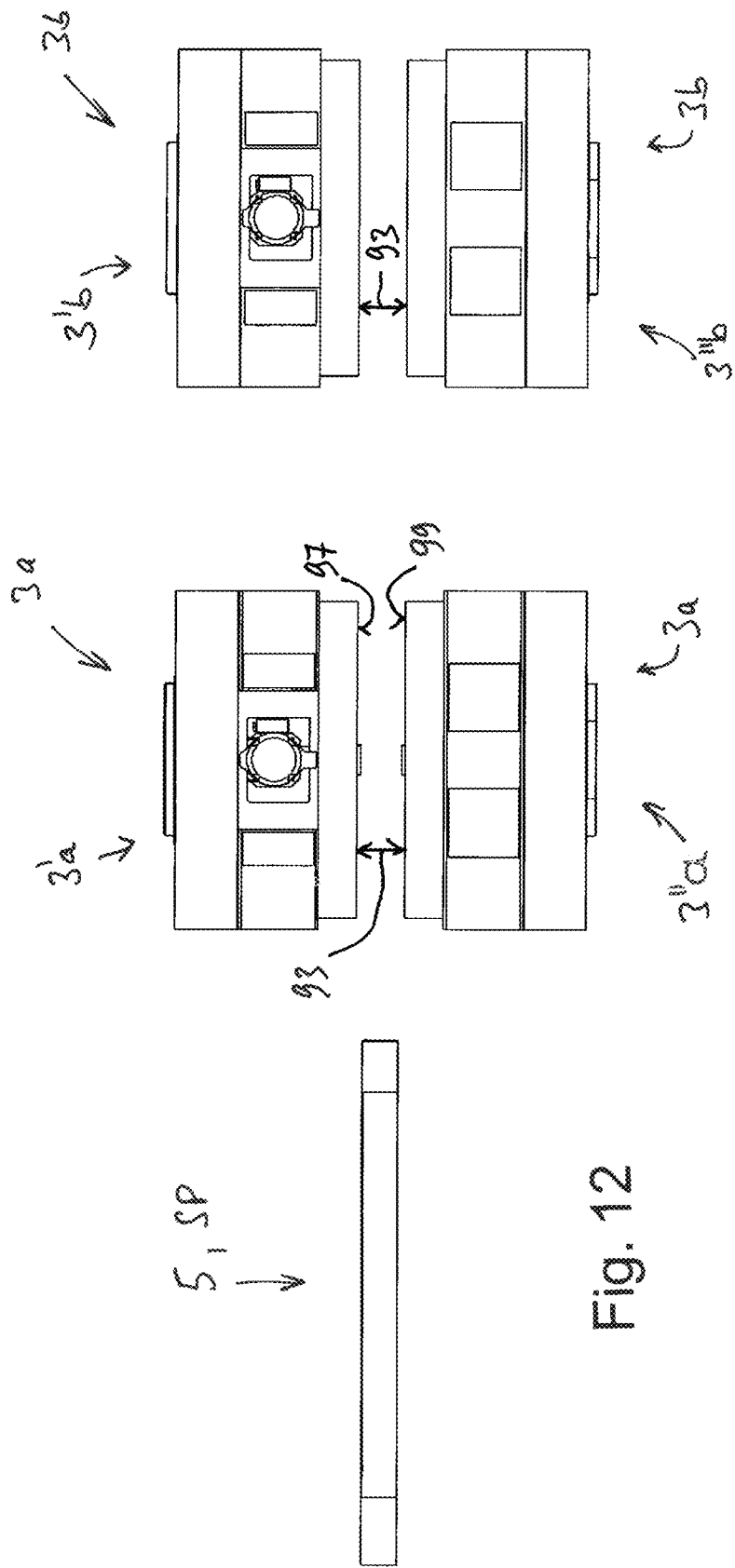

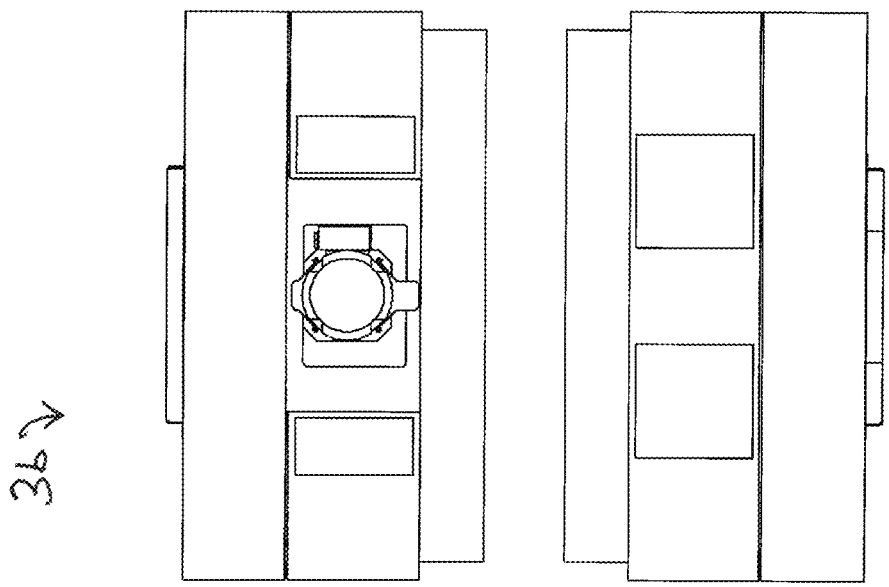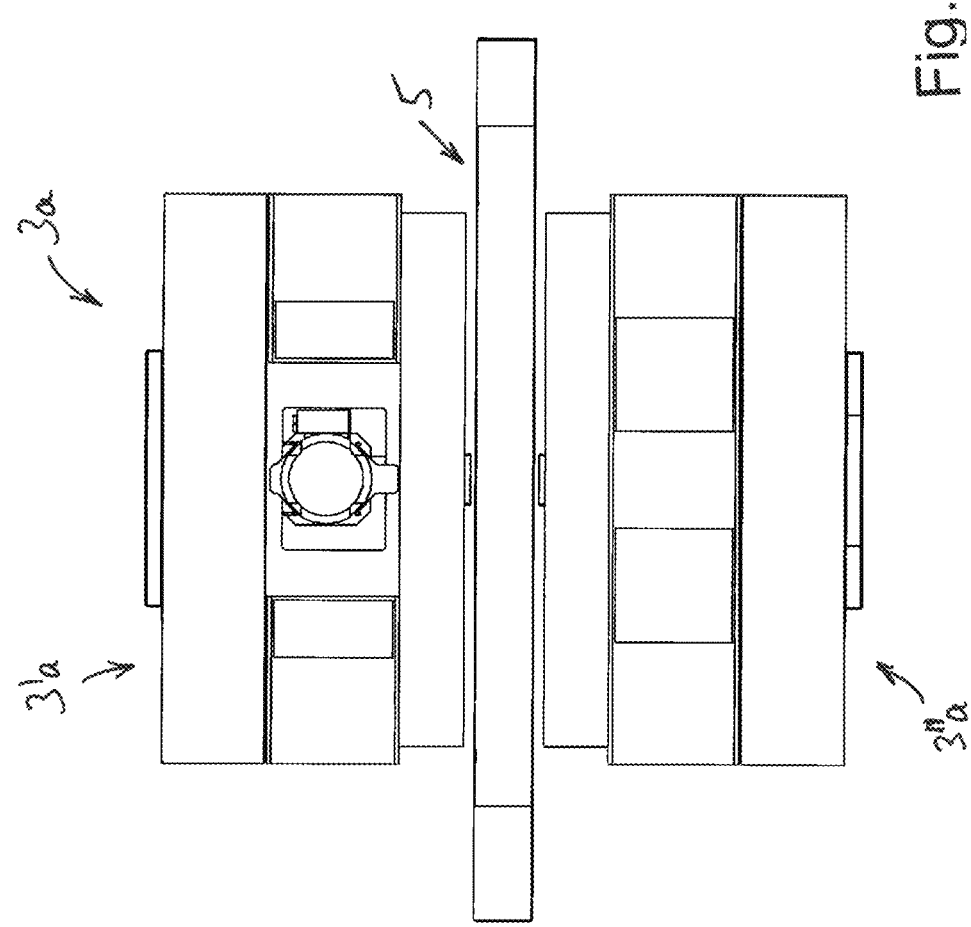
Fig. 13

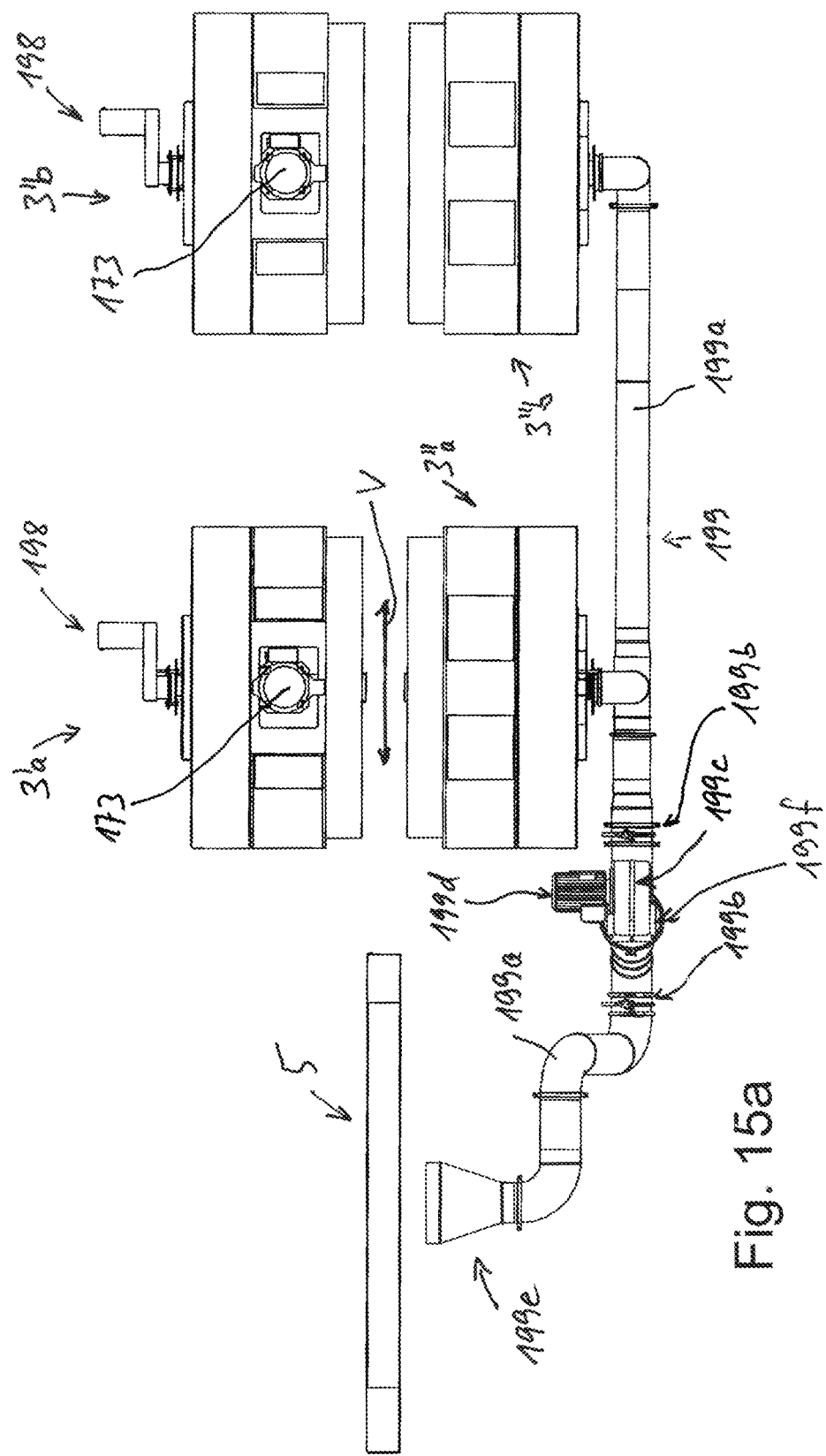

DEVICE FOR THE UNIAXIAL OR BIAXIAL STRETCHING OF PLASTICS MATERIAL PORTIONS

This application claims priority to DE 10 2018 101 455.4 filed Jan. 23, 2018, the entire content of which is hereby incorporated by reference.

The invention relates to a device for the uniaxial or biaxial stretching of plastics material portions, in particular of flat or plate-shaped plastics material portions.

Such stretching units are used in particular to stretch small film samples. These film samples usually have a size of about 10 cm×10 cm. Such a stretching unit, which is often also referred to as a stretching frame, is many times smaller than a longitudinal, transverse and/or longitudinal and transverse stretching unit (sequential stretching units), in particular in the form of a simultaneous biaxial stretching unit.

In contrast, the stretching unit described in the context of the present invention may be referred to rather as a laboratory stretching unit or laboratory stretching machine for carrying out stretching tests on the basis of comparatively small plastics film portions.

In such stretching units it should be ensured that the films are subjected to the same physical conditions during the stretching process, as with large longitudinal and/or transverse stretching units. For this purpose, the film is inserted into a frame which comprises two pairs of guide rails mutually offset by 90°, which are arranged at a distance from one another and ultimately form a rectangular or preferably square frame, on which clips are movably arranged. The first group of clips positioned on two mutually parallel offset guide rails is used for stretching, for example in a first direction (often called the longitudinal direction or MD direction), and the clips positioned with an offset of 90° on the two other guide rails are used for a displacement in a direction perpendicular thereto (also called transverse direction or TD direction, for example). The clips are connected to each other at a scissor linkage, so that during the stretching process during the spreading apart of the guide rails, which are positioned in pairs, offset by 90°, the clips are spaced apart in a uniformly increasing way.

Stretching frames are generally known, but there are several types of stretching frames. In principle, a distinction is made between stretching frames with a symmetrical stretch or with a fixed stretch point.

In a symmetrical stretching the mentioned pairs of guide rails can only be moved symmetrically with respect to a centre or central point of the stretching frame, i.e. in opposite directions away from each other or in opposite directions towards each other.

A device for preferably discontinuous and biaxial stretching of films or plates, in particular made of plastics material, by means of clips engaging the edges of the films or plates has become known, for example, from DE 1 928 734 U. This stretching device comprises four guide rails which are arranged in a square with respect to one another in a plan view, wherein a respective pair of opposite guide rails can be displaced towards and away from one another by a suitable drive means. On these guide rails rods are provided, which are V-shaped in plan view and which are adjustable with different angle settings to each other, on which rods clips are held and guided.

A film or plastics plate to be stretched may then be positioned at the centre of this arrangement and fixed to the edge by means of the clips. If the guide rails are then symmetrically displaced outwards pairwise, then the film or plastics plate therebetween is subject simultaneously to a stretching in the longitudinal and width directions, for example. Thus, a symmetrical stretching away from the centre of the stretching frame in two mutually perpendicular stretching directions occurs.

A stretching frame with a fixed stretching point is known for example from DE 10 2009 003 751 B4.

The special feature of this known stretching frame is that two mutually perpendicular guide rails, on which clips for clamping and stretching the film portion are provided, are arranged in an unmovable manner. In the initial or clamping position, the two respective opposite guide rails with the clips positioned thereon are fed towards the stationary guide rails by the clips seated thereon to provide the smallest possible starting and clamping area. In this position, the plastics film portion to be stretched can be clamped, for example, with its initial size of 10 cm×10 cm. Then two of the mutually perpendicular guide rails are moved away from the fixed guide rails in order to perform the biaxial stretching.

Although this device has the advantage that the clamping position is provided on the stretching frame edge, that is to say on a corner region, it has nevertheless been shown within the scope of the invention that the stretching conditions which are desired per se cannot be provided by such a stretching frame, which stretching conditions are as identical as possible or as close as possible to those present on a conventional longitudinal and/or transverse stretching unit.

It is therefore an object of the present invention to provide an improved device for the uniaxial or biaxial stretching of plastics material portions, in particular in the form of plastics films, plastics plates, plastics membranes or plastics mesh, etc., which is superior to the previously known solutions.

The object can be achieved according to the invention. Advantageous embodiments of the invention can also be achieved.

The solution according to the invention is based on the fact that—as is also known in principle from the prior art—in a stretching frame, the stretching process itself is carried out symmetrically or substantially symmetrically. That is, the clamped plastics material portion, for example in the form of a plastics foil or plastics film portion or in the form of a plastics plate, a plastics membrane or plastics fabric, is held, while being clamped centrally in the stretching device, in this starting position, in order to then move the respective guide rails away from each other, which guide rails are set at a distance and parallel to each other, with the clips provided thereon. If this occurs only in one direction, the stretching is carried out uniaxially. If this happens simultaneously in two mutually perpendicular directions, then the stretching becomes biaxial, namely simultaneously in general, although in the case of a biaxial stretching too, fundamentally the one pair of guide rails with the corresponding clips may be moved away from each other, whereupon, with a temporal offset, the clips positioned on the other guide rails offset by 90° may be correspondingly moved away from each other, in order to initially perform a stretching in the MD direction or subsequently in the TD direction (or vice-versa).

However, this superior stretching process has the disadvantage that the film portion to be stretched must be inserted centrally in the stretching frame.

The invention now primarily provides a solution in that an optimal stretching for plastics material portions can be carried out, in particular under conditions that are very close to those present during a stretching process in a longitudinal and/or transverse stretching unit, and that nevertheless there is an easy way to insert the plastics material portion to be stretched into the clips. Thus, the mentioned plastics material portions are flat structures, i.e. as mentioned, for example, in the form of a plastics foil portion, a plastics film portion, a plastics plate, a plastics membrane or a plastics fabric, i.e. bodies and structures which have a two-dimensional shape, in particular in relation to the thickness of the body or material. In the present document, for convenience, the terms used are mainly 'plastics body' or, for example, 'plastics film portion' or simply 'film portion', although these should not be understood in a limiting sense.

According to the invention, this is achieved in that the adjustment area, with the guide rails, which are to be moved towards each other, and the clips, which are positioned at a small distance from one another, is not performed in a central position in the stretching frame, but rather in an off-centre side position, in which the clamping area is positioned comparatively close and adjacent to a lateral boundary of the stretching device. Subsequently, the clamping area with the clamped film portion may then be moved into a more centred or at least approximately centred position in the stretching device, in order primarily to perform, starting from this starting position, the actual stretching process.

The solution according to the invention is thus characterised as an alternative and an addition to the solution described above in that at least one pair of guide rails is not only movable towards each other and away from each other for carrying out the stretching process, but may also be moved in the same direction simultaneously or with a temporal offset towards one another in only one direction, namely firstly to the clamping position on the edge of the stretching device and then to a more central starting position, in order to subsequently perform the stretching starting from this position.

The guide rails, which are offset by 90° thereto can, as before, also be driven in such a way that they can either be moved away from one another to carry out the stretching step or be moved towards one another to return to the starting position.

In a preferred embodiment, the additional displacement towards a clamping position or away from a clamping position into a stretch starting position, may occur, for example, by means of two motors with separate drive means, for example in the form of a respective drive run, which respectively drive and thus displace one of the two parallel and laterally spaced guide rails. Through suitable transmission mechanisms, for example in the form of gears or intermediate gears, such a drive may in some circumstances also be implemented by a single motor.

Preferably, for moving the guide rails, which are offset by 90°, apart or towards one another a second motor may be provided, which, similar to a sliding door drive, is provided with a run positioned around two mutually offset rollers or guide wheels, such as chain-like transmission means, wherein the upper run of this chain-like or belt-like transmission means is connected to one guide rail and the lower run of this chain-like or belt-like transmission means is connected to the other guide rail, for example in each case via a respective follower. As a result, either the two guide rails are moved towards each other or are moved away from each other by reversing the direction of the drive motor, by using the mentioned circulating drive or transmission means.

The above-mentioned drive and/or transmission means, which is drivable by the drive motor in two opposite directions of rotation, may be implemented by any appropriate measure, for example by a belt drive or a chain drive which is preferably provided with additional chain tensioners or chain tensioning members, etc.

Although in the prior art it is already known that a stretching frame with inserted film portions may be moved from its loading or insertion position, in which the film portion is inserted into the stretching frame, into an oven to perform the stretching therein, in a preferred development of the invention it is now envisaged that the device is provided with a plurality of preferably successively arranged ovens for stretching a film portion, and in particular with separating devices between the ovens, which in addition may be closable, in contrast to prior solutions. Shutter diaphragms are already known in the prior art, wherein these diaphragms are used to separate two adjacent ovens from each other when the stretching frame is moved from one oven to the next. However, the previous shutter diaphragms have never been completely closable, resulting in a non-negligible heating air flow exchange between the inside of the oven and the outside.

In this case, the ovens provided in the context of the invention may preferably be used to implement different steps. Thus, one oven can be provided to heat the film portion, whereas a second oven arranged behind it is used as a first annealing zone and a third successive oven may be used, for example, as a further annealing zone or cooling zone and can function with different temperature conditions.

Furthermore, preferably not only a passive air supply but also an active air supply may be provided in the ovens, preferably either above or below the film portion to be stretched. But it is also possible to provide an active air supply both above and below the film portion to be stretched. The air flow may also be thermally pre-regulated.

Further preferred improvements result from, for example, the fact that the air supply in the ovens takes place by means of fans, which are not driven by belts or V-belts, but are directly mounted on the shaft of a fan motor. The device is thus quieter and easier to maintain.

In addition, it has proved advantageous to provide the entire device for stretching a film portion with corresponding insulation, namely above and below and on the side of the movable stretching frame, so that a closed, insulated space is formed together with the carriage.

In addition, even better stretching results are achieved when a film portion to be stretched in an oven is not heated by means of an infrared oven (because then the heating can take place only when the film portion to be stretched is in the oven), but for example via preferably preheated air, so that the film portion to be stretched can enter into an already preheated oven.

A further improvement can be achieved also by the fact that improved clips are used with respect to the prior art. As mentioned, the clips on the individual guide rails are freely movable, even if, for example, a clip to be centrally arranged in the entire stretching frame is not moved in the longitudinal direction of the guide rail during the stretching step. Preferably, a central clip is used as a measuring clip, in which therefore preferably no movement takes place relative to the guide rail carrying said clip.

For this purpose, a holding mechanism for the clips is provided, which comprises, for example, respective bending or strain-measuring devices, for example in the form of bending gauges or strain gauges. These can be used to measure the force with which the film is stretched. The preferred solution is thus characterised by the fact that the preferably centrally positioned measuring clips are freely movable and not fixed relative to the respective associated guide rail (although a central clip does not move away from its central position on the guide rail during the stretching process due to the symmetrical stretching process) and that the bending or strain-measuring device is in the form of a bending or strain gauge, which is parallel or at least approximately parallel to or lies in the plane of the film portion to be stretched.

Preferably, the clips may be closed by means of air pressure control or nitrogen control and are opened when venting the working cylinder by means of an integrated spring force accumulator.

The actual clamping surfaces of the clip clamping portions and/or of the clip table, on which the clamping portion of the clip clamping device is seated by fixing the edge of the film portion, can be designed differently depending on the film material used. Jagged clamping surfaces are proposed, as well as smooth clamping surfaces or rubberised clamping surfaces. There are no restrictions in this respect.

The described device for stretching foil or film portions is basically suitable for different plastics materials, as well as for differently adjustable stretching conditions. Thus, plastics materials such as PP, PET, PEA, PS, PVC, PTFE and the like can preferably be stretched with the described device. This can be done in each case within an ideally adjustable temperature window, in particular with a variety of stretching speeds and stretching rates.

After carrying out a stretching process with the described stretching device according to the invention, tests can then be carried out on the stretched film portion, for example in a laboratory, so that from the results of these investigations conclusions can be drawn regarding the way in which a corresponding film of the same composition may be produced on a large stretching production unit.

With the device according to the invention it is also possible, through a series of tests, to find and test an optimal mixture of raw materials and the proportions of the respective preferred additives in order to produce an optimum product with improved properties and/or, for example, also to be able to save raw materials, in particular when, for example, as a result of the subsequent tests it is found that even with a lower film thickness, the same preferred film properties are established.

In summary, it can thus be stated that the stretching frame according to the invention has a number of advantages, in particular within the scope of its preferred embodiment and development. Thus, while in the case of stretching frames with a fixed stretching point, such as in DE 10 2009 003 751 B4, it is not possible to ensure uniform drawing or stretching, this is achieved in the context of the present invention by using a stretching frame, which is asymmetrically moved, while maintaining optimal insertion and clamping conditions. When using the oven or ovens immediately adjacent to the clamping and framing position of the stretching frame, in the context of the present invention, in a preferred embodiment, the desired temperature may already be set when the film sample is inserted. This then provides a much better approximation of the real conditions on a large conventional stretching unit. Another great advantage of using multiple ovens is that they can be used with different temperatures. Preferably, the different ovens are then separated from each other by shutters. As soon as the film sample in the stretching frame moves into the respective oven, the shutter opens and closes again as soon as the film is in the respective oven. Thus, the respective oven can be optimally maintained at temperature.

BRIEF DESCRIPTION OF THE DRAWINGS

The invention will be explained in more detail in the following, with reference to the drawings. In detail:

FIG. 12, 13 are two schematic side views of two consecutively provided ovens, each having an oven upper side and an oven base, between which the stretching frame is movable;

FIG. 14b is a corresponding view to FIG. 14a, but for an oven after stretching of the plastics material portion is completed, in particular for a post-treatment and/or annealing zone having an exhaust opening, which is enlarged with respect to FIG. 14a;

FIG. 15a, 15b are a schematic side view and a spatial view of two successively provided ovens, each having an upper and a lower oven, which are once passively ventilated and once actively ventilated;

With reference to FIG. 1a, a schematic structure of a device for stretching a film portion is shown.

The device comprises a loading and/or unloading zone 1, which is usually freely accessible, at least when inserting a film portion to be stretched.

In the embodiment shown, the device for stretching (which is also sometimes referred to below as a stretching device or a stretching unit) comprises, in addition to the loading and/or unloading zone 1, at least two ovens 3a, 3b provided successively in a longitudinal direction, wherein usually after the last oven, in the variant according to FIG. 1a, a switching cabinet 2 is also provided. A stretching frame discussed below for performing a stretching and/or for carrying out a holding, shrinking and/or cooling or heating process or an annealing or cooling process may be moved in and out of the ovens.

Figure 1A:
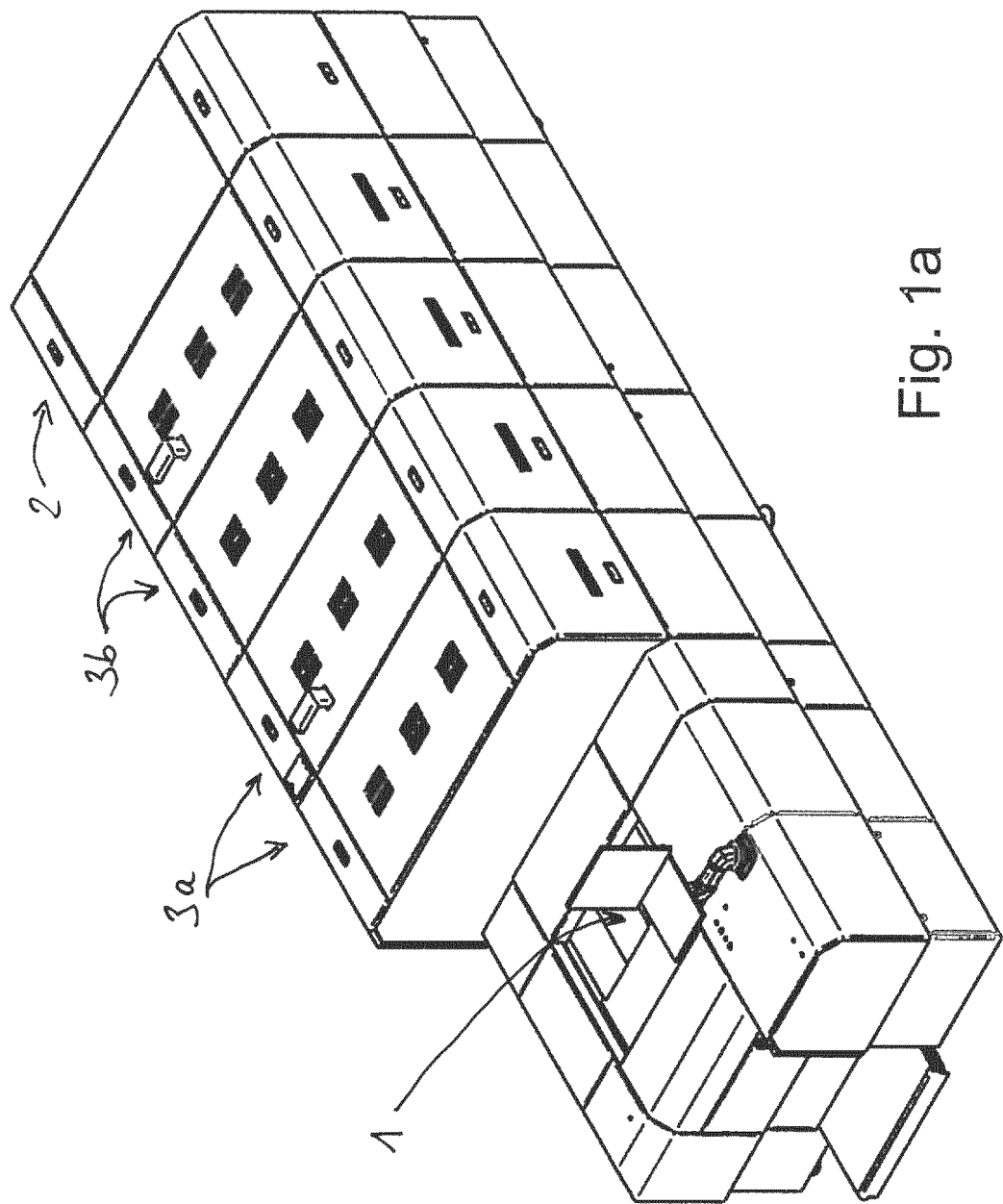
FIG. 1a is a schematic overall view of a device for stretching film portions with two downstream ovens.
Figure 1B:
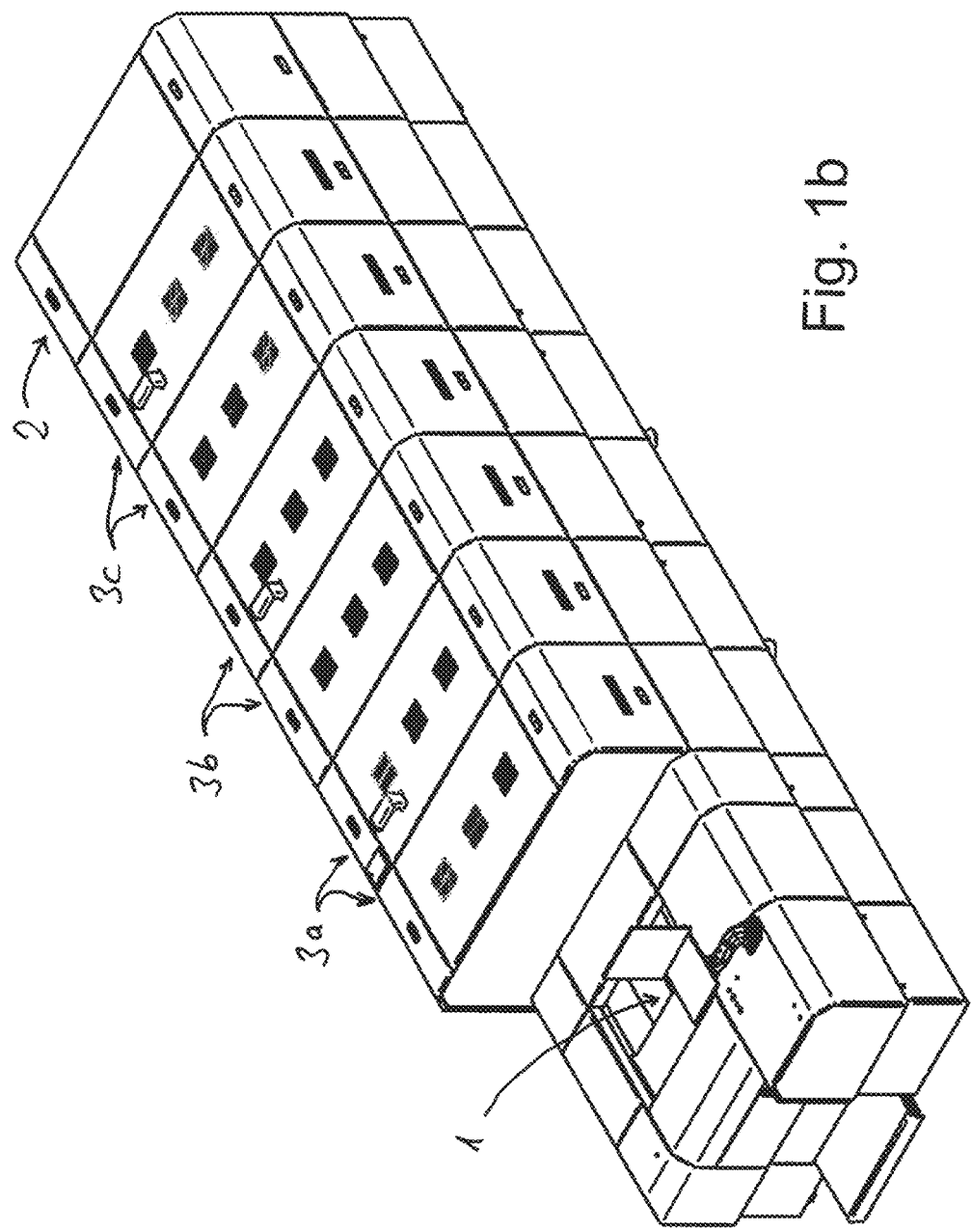
FIG. 1b shows a modification with respect to FIG. 1a with a device for stretching (stretching unit) having three downstream ovens.

The variant according to FIG. 1b differs from the embodiment according to FIG. 1a in that, instead of two ovens, three successive ovens 3a, 3b and 3c are provided, wherein the aforementioned switching cabinet 2 is also connected thereto. It should be noted at this point that both in the embodiment of FIG. 1a and in the embodiment of FIG. 1b, the cabinet is optional, i.e. it can also be positioned at a completely different location and does not necessarily have to be connected behind the ovens on the housing. It is also to be noted that the embodiments of FIGS. 1a and 1b are shown only by way of example, wherein the inventive device for stretching may in some circumstances only comprise a single oven or, for example, more than three ovens, i.e. for example at least four ovens, or at least five ovens.

The device for stretching a film portion is basically designed in a spatial representation in the manner of a stretching frame 5 (FIG. 2), in particular with a surrounding frame 5a.

Figure 2:
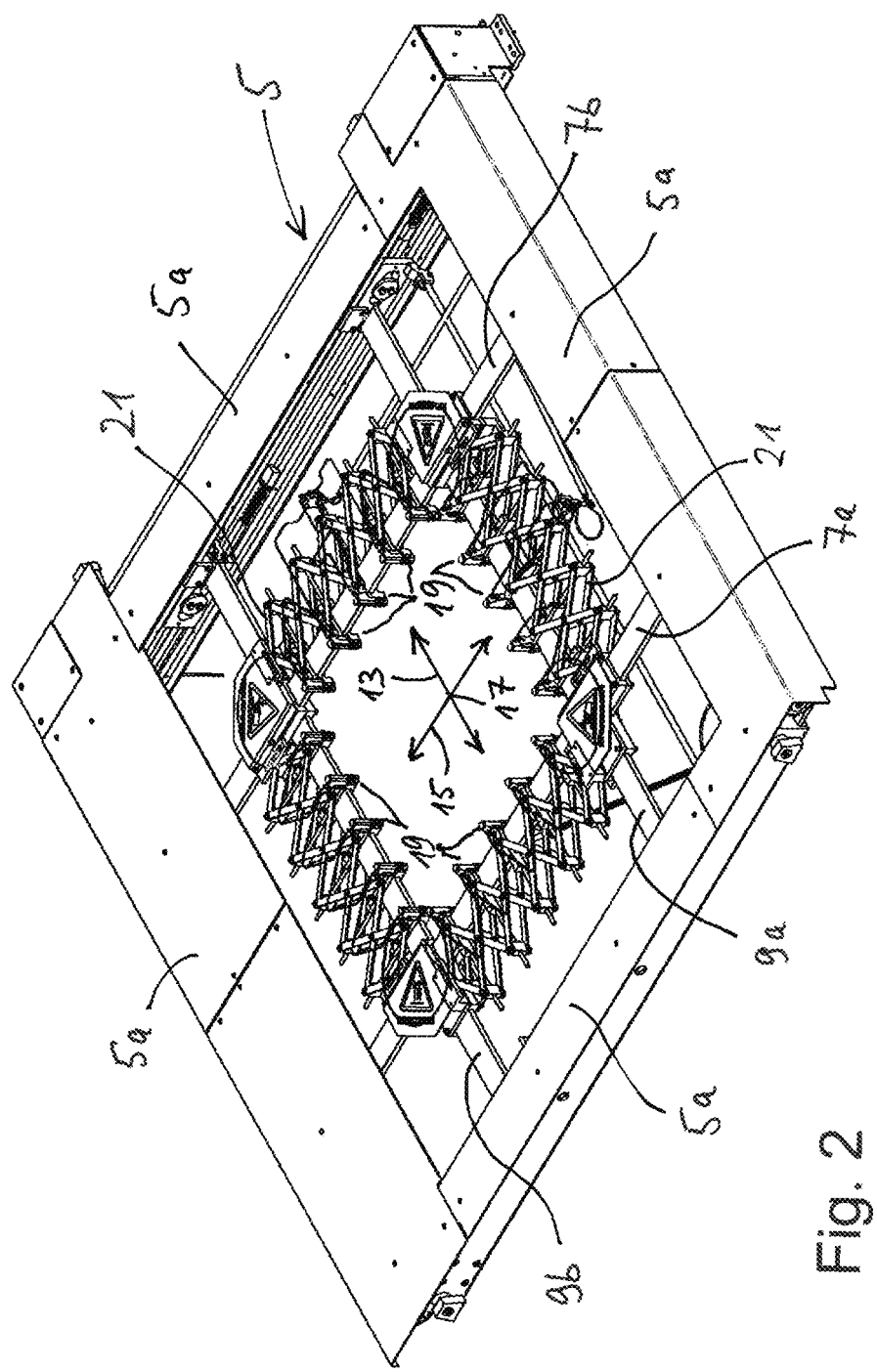
FIG. 2 is a schematic spatial plan view of a stretching frame according to the invention having guide rails movably arranged therein and clips held thereon.

As shown in the schematic spatial representation according to FIG. 2, two pairs of guide rails 7a, 7b and 9a, 9b are arranged inside the stretching frame 5.

In this case, the two guide rails 7a, 7b, which are parallel to one another with a lateral offset, form two first guide rails which can be moved away from or towards one another in a first direction according to the double arrow 13. The adjustment according to the double arrow 13 can also be referred to as an adjustment in the longitudinal direction (also frequently called the MD direction).

The second pair of guide rails 9a, 9b is also arranged with a mutual lateral offset within the stretching frame 5, in particular perpendicularly to the first guide rails 7a, 7b. These second guide rails 9a, 9b are also movable according to the double arrow 15 away from each other or towards each other, and preferably like the first guide rails in each case symmetrically to a middle or central point 17 of the stretching frame 5.

A plurality of clips 19 is respectively arranged on each of the guide rails 7a to 9b, wherein the clips 19 arranged on a guide rail 7a to 9b are connected to each other via a link chain 21, which is also known as 'Nürnberger scissors' (also 'lazy tongs'). Sometimes this is also called a scissor grid.

Figure 3A:
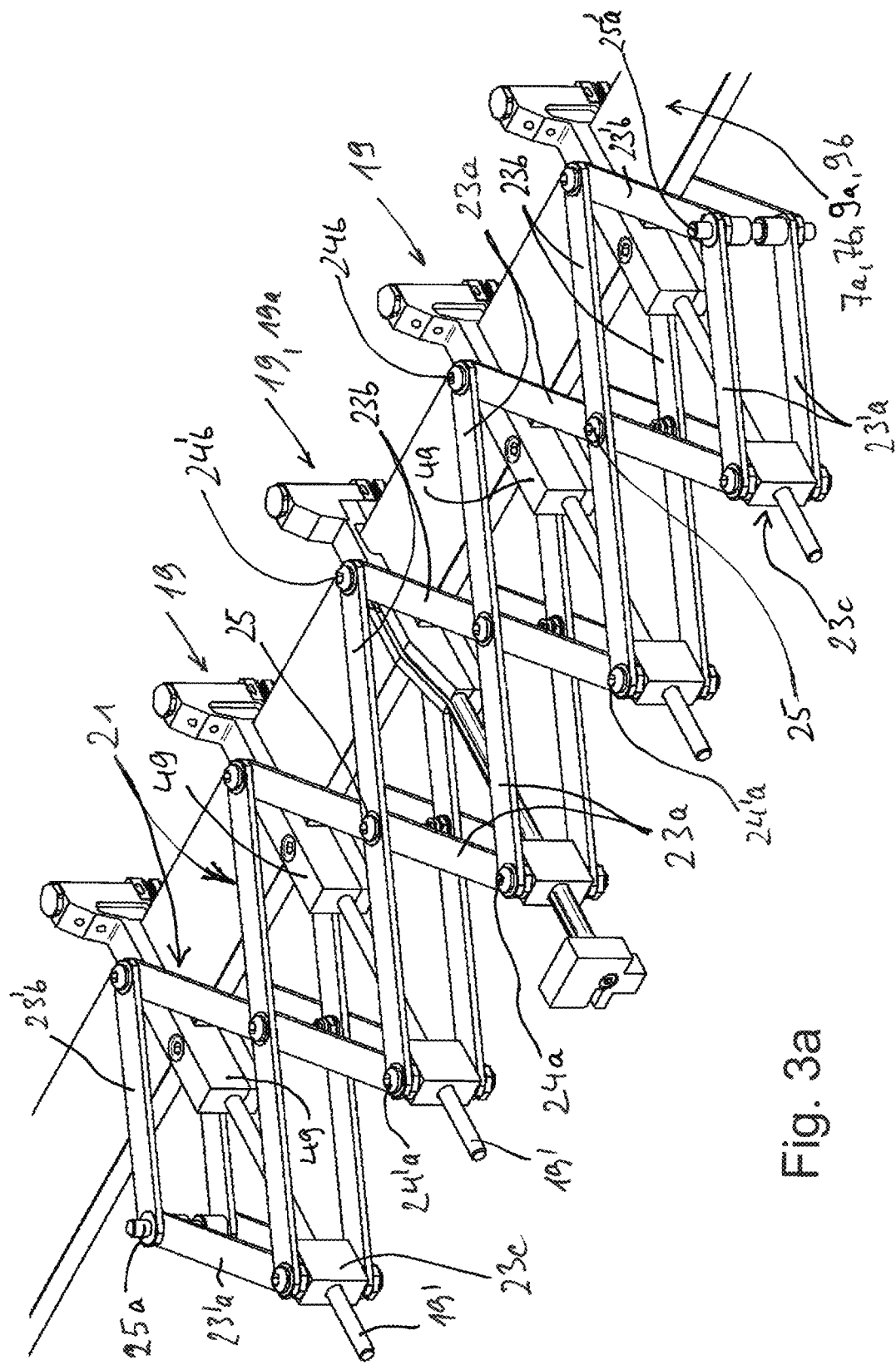
FIG. 3a, 3b show two partially reproduced guide rails with clips positioned thereon, which are coupled together via a scissor gear.
Figure 3B:
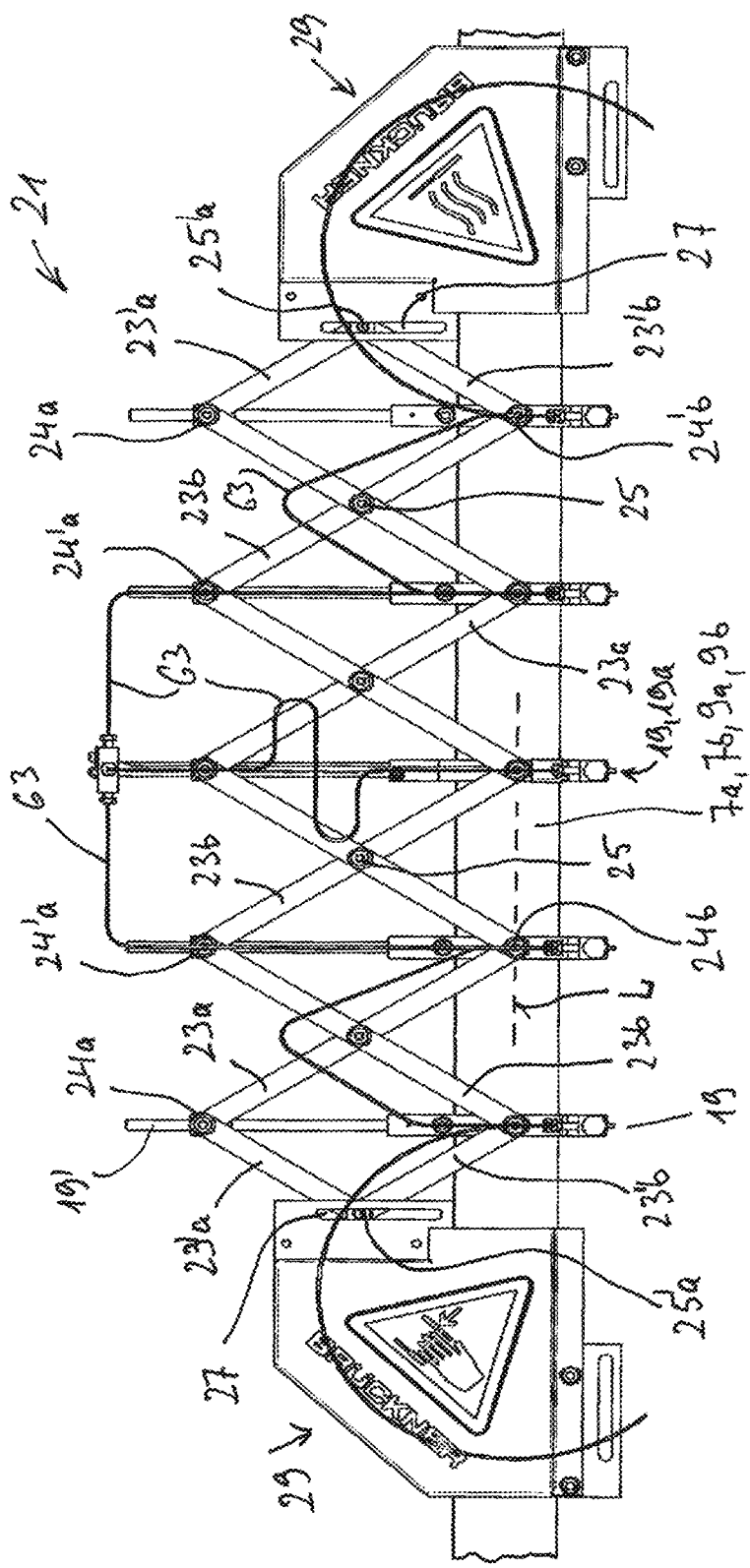

This link chain 21 is shown in detail in an enlarged view in a spatial representation or plan view of a guide rail 7a, 7b, or 9a, 9b with reference to FIGS. 3a and 3b.

This link chain 21 ('Nürnberger scissors') consists of a plurality of crossed bars or scissor levers 23a and 23b which are arranged more or less in a plane parallel to a guide rail. In this case, two zigzag-shaped mutually extending scissor lever arrangements are used to form the mentioned link chain 21. In FIG. 3a it can be seen that a first scissor lever arrangement having a first zigzag-shaped scissor lever 23a and a second scissor lever arrangement having a likewise zigzag-shaped scissor lever 23b, which is offset and oppositely extending, are provided. Thus, two successive scissor levers 23a are each positioned in a V-shape with respect to each other, wherein two successive first scissor levers 23a having a V-shape in plan view are connected to each other in an articulated way, for example by means of joints or joint axes 24a which are remote from the clips. At the end opposite the joint or joint axis 24a of the respective first scissor lever 23a, these are in turn connected to a further first scissor lever 23a by means of a joint or a joint axis 24b which lies nearer to the clips. Thus the first zigzag-shaped scissor lever arrangement is formed.

Furthermore, the mentioned second scissor lever arrangement is provided, wherein the scissor levers 23b are correspondingly arranged in a V-shape, wherein each two successive scissor levers 23b are also connected in an articulated way via joints or joint axes 24'a which are remote from the clips, or via joint axes 24'b nearer to the clips, to a respective successive second scissor lever 23b.

Both zigzag-shaped scissor lever arrangements on the one hand with the scissor lever 23a and on the other hand with the scissor lever 23b are then offset from one another so that respectively a first scissor lever 23a intersects a second scissor lever 23b and both are connected to each other in a hinged manner at the intersection through a central pivot point or a central axis of rotation 25.

The link chain 21 shown with reference to FIG. 3a is implemented with respect to all four guide rails 7a, 7b and 9a, 9b, for which reason all four reference numerals 7a, 7b, 9a, 9b are drawn in FIG. 3a for the only guide rail shown.

The first scissor levers 23'a and the cooperating second scissor levers 23'b are then formed with only about half the length in the opposite end regions in the direction of the respective guide rail 7a, 7b or 9a, 9b of each of the four link chains 21, so that their common axis of rotation 25'a preferably ends in a guide device 27 and is guided therein in an adjustable manner perpendicularly to the extension direction of the guide rail. This can be seen in the schematic plan view according to FIG. 3b. The outer scissor levers, which are approximately only half as long, are indicated by the reference signs 23'a and 23'b.

It can also be seen in FIG. 3a that the link chain 21 is a quasi-double chain and comprises two link chains overlapping congruently in plan view with scissor levers 23a and 23b, which are arranged at a smaller distance from each other, but which is sufficient to allow the link points 24b of the scissor levers 23b, which preferably protrude in the direction of the centre of the stretching frame, to lie above and beneath the corresponding guide rail 7 or 9.

The above-mentioned link points 24b provided in the region of the clips 19 are rigidly connected to the clips or clip bodies at these locations, so that in the plan view of FIG. 3b, the axes 24b and the associated clips 19, regardless of the spreading movement of the link chain 21, always remain at the same position with respect to the width of the guide rail, so that they are displaceable only according to the dashed line L in FIG. 3b relative to the respective guide rail.

The vertical axes of rotation 24a and 24'a remote from the clips 19 also comprise spacer bodies 23c, thereby keeping the upper and lower planes of the scissor levers 23a and 23b at a distance. The vertical link axes 24b and 24'b near the clips lie, in a top view, in the region of the respective guide rail, so that the joint axes do not extend continuously between the upper and lower plane of the respective scissor lever arrangement, but instead a separate joint 24b or 24'b for the upper and lower plane is provided, which is congruent in the plan view, with the respective guide rail extending therebetween.

As mentioned, the joint axes 24b and 24'b near the clips are thus each connected to the associated clip bodies. The mentioned spacer bodies 23c between the upper and lower planes of the scissor levers 23a and 23b are provided with a guide, preferably in the form of a bore, through which an extension portion 19' extending perpendicularly to the path of the respective guide rail extends, wherein this extension portion 19' is rigidly connected to a bearing and support construction 49, which supports the clip or the clip body 19, which then joins the extension portion 19' directed away from the clip body 19, so that, when the link chain moves apart or together, the corresponding clip bodies are moved away from each other along the guide rail, forming a larger lateral distance from one another, or are moved towards each other forming a reduced lateral distance from an adjacent clip, while the clip bodies always remain perpendicular to the extension of the respective guide rail.

If the respective link chain 21 is moved apart along the guide rail, wherein the lateral clip spacing between two adjacent clips is increased, the spacer bodies 23c slide on the rod-shaped extension portion 19' shown in the embodiment in the direction of the guide rail, whereby the central axes of rotation 25 (on which two scissor levers 23a and 23b intersect) move with a half-movement component in the direction of the guide rail. This because the link axes 24 near the clips are fixed with respect to the associated clip body or the bearing or support structure 49 supporting the clip.

Thus, the mentioned guide bodies 23c positioned between the upper and the lower plane of the scissor levers 23a and 23b are also acting as guides.

As can be seen from the enlarged detail according to FIGS. 3a and 3b and from the overall spatial representation of FIG. 2, the clips 19 connected via a scissor-type construction in the manner of a link chain 21 are coupled to adjusting guides in the form of corner connectors 29. In this case, these corner connectors 29 each have an opening, in which the corresponding corner connector is movably guided on the one hand relative to one guide rail 7a or 7b and on the other hand relative to the second guide rail 9a, 9b which perpendicularly intersects this guide rail in the region of the corner connector 29.

With this construction, the moving together of the clips 19 and, during the stretching process, the moving apart of the clips 19 may be performed, while maintaining increasing but always equal lateral distances between two respective adjacent clips 19 on a guide rail 7a to 9b in that, for example, both first guide rails 7a and 7b are separated according to the double arrow 13 (FIG. 2) while increasing their respective intermediate distance. Thus, the corresponding adjustment guides 29 formed by the mentioned corner connectors 29 are entrained by both guide rails 7a, 7b, whereby the clips 19 connected to each other via the pantograph on the perpendicularly extending guide rails 9a, 9b are moved apart while forming an increasing intermediate distance between the supported clips. Such an adjustment may be used, for example, to uniaxially stretch a film as will be discussed below.

If the second guide rails 9a, 9b perpendicular thereto are also moved apart simultaneously or with a temporal offset according to the double arrow 15, then the adjustment guides/corner connectors 29 which are held in a guided way on these guide rails are accordingly carried simultaneously via these second guide rails 9a, 9b, in particular while increasing the distance between both guide rails 9a, 9b, so that the clips on the first guide rails 7a, 7b are also gradually moved away from each other (also with equal distances). The mentioned link chain 21 is progressively rotated into the opening position during the spreading of the guide rail, whereby the distances between all adjacent pairs of clips become larger, but remain the constant.

For the sake of completeness, it should be mentioned at this point that the two first guide rails 7a, 7b are located on a first rail guide plane, and the second guide rails 9a, 9b perpendicularly intersecting them are positioned at least at a height equal to the material thickness of the guide rail in a second rail guide plane located thereabove or therebeneath. However, the clips seated thereon are usually adjusted so that the clamping planes of all the clips 19 form a common clamping plane E, regardless of whether they are slidably arranged on the first or second pair of guide rails 7a, 7b or 9a, 9b. Thus, in other words, it can be said that the clamping plane E of the clips 19 is also the travel plane of the clips 19, i.e. plane E is the plane in which all of the guide rails 7a, 7b and 9a, 9b are positioned or substantially positioned.

The adjustment of the two first and the two second guide rails can be achieved by suitable drive means, as is schematically explained with reference to FIGS. 4a to 4c.

In this case, the adjustment device for the first pair of guide rails 7a, 7b is shown below with reference to FIG. 4a, which guide rails are respectively mutually adjustable towards or away from each other in the transverse direction (TD). The parts required for this adjustment process are highlighted in a darker colour in FIG. 4a.

Figure 4A:
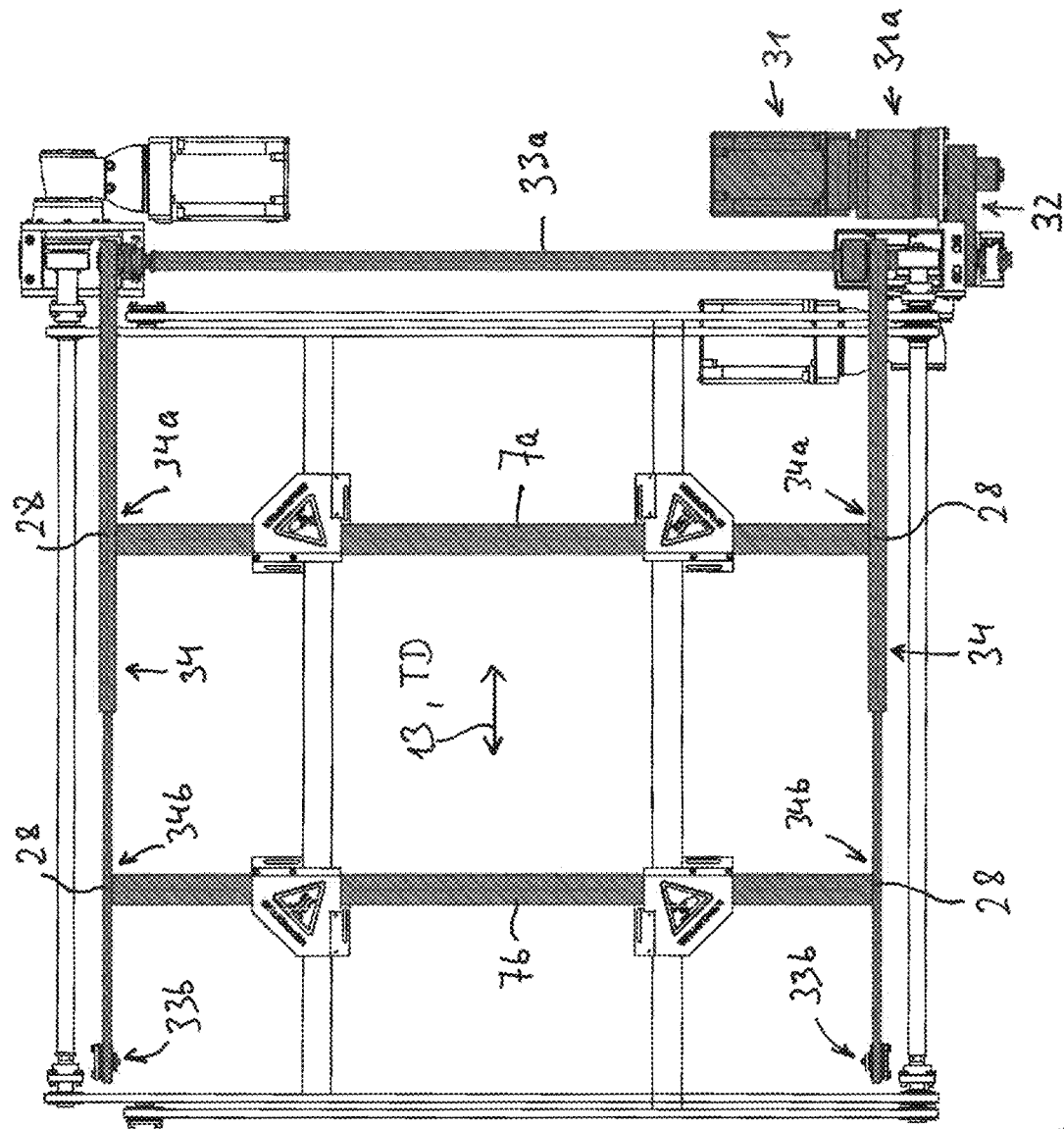
FIGS. 4a to 4c are three schematic representations for explaining how two mutually parallel guide rails can only be moved at the same time towards each other and away from each other, while a second pair of guide rails, perpendicular thereto, may also be moved separately from each other in two opposite directions.

For example, according to FIG. 4a, a first deflection shaft 33a is driven via a first drive motor 31 and a gear mechanism 31a arranged downstream of this drive motor 31 and a peripheral first transmission means 32. This first guide shaft 33a is connected via a further peripheral second transmission means 34 in connection with a second deflection shaft or guide wheel 33b, which is offset thereto and extends in parallel to the first deflection shaft 33a. In other words, the opposite deflection arrangement opposite to the first deflection shaft 33a for the transmission means 34 is not necessarily a continuous deflection shaft but, as shown in FIG. 4a, an opposite deflection wheel 33b rotating about a wheel axis may also be provided. The transmission means 34 itself may be fundamentally formed in the manner of a chain, belt, band, spindle, etc.

Chains are preferred due to the specific conditions of use.

The two transmission shafts 33a, 33b are arranged in parallel at such a distance to provide enough space to reach a maximum stretching position for the aforementioned guide rails 7a, 7b driven thereby.

Figure 4B:
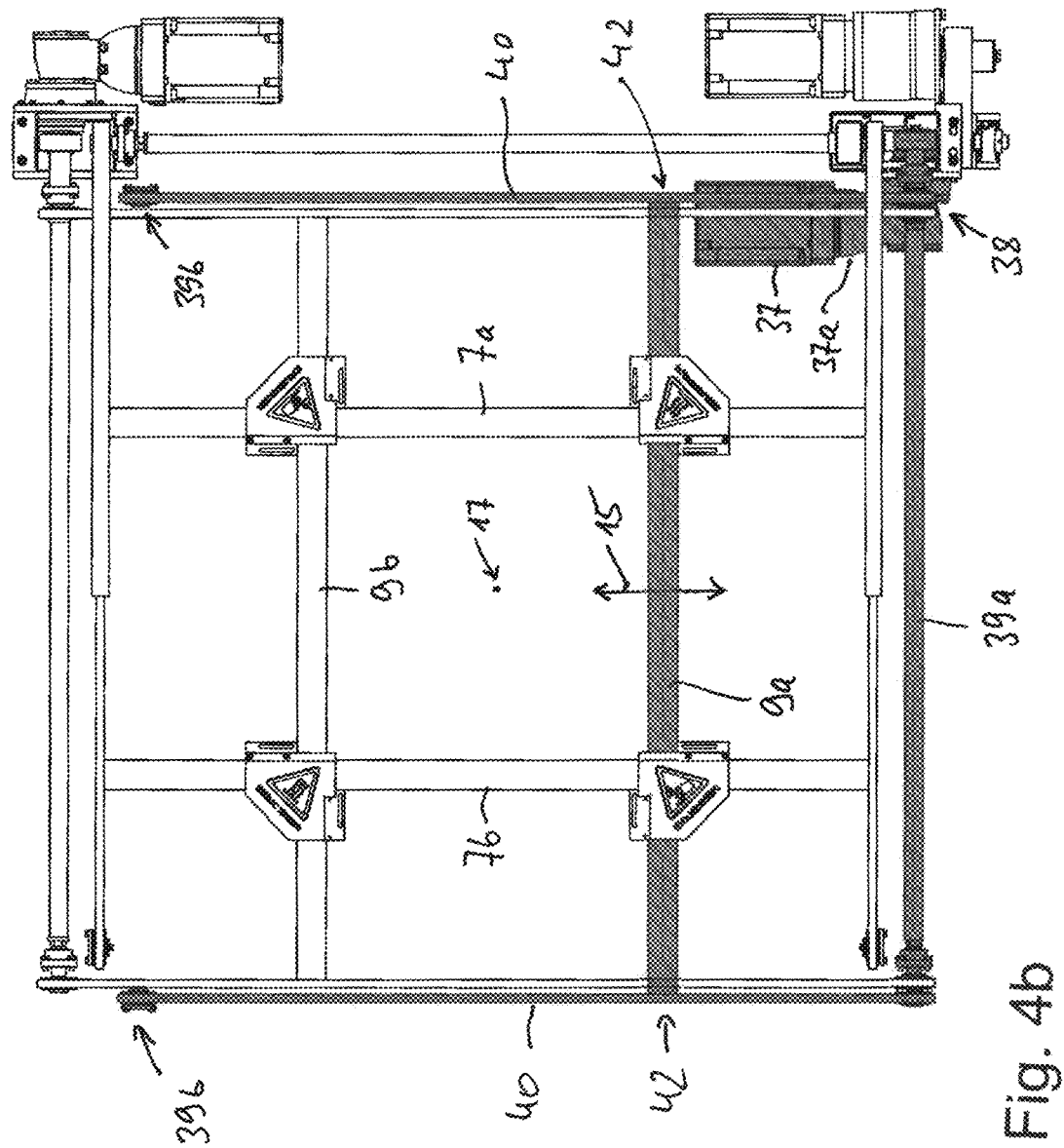
Figure 4C:
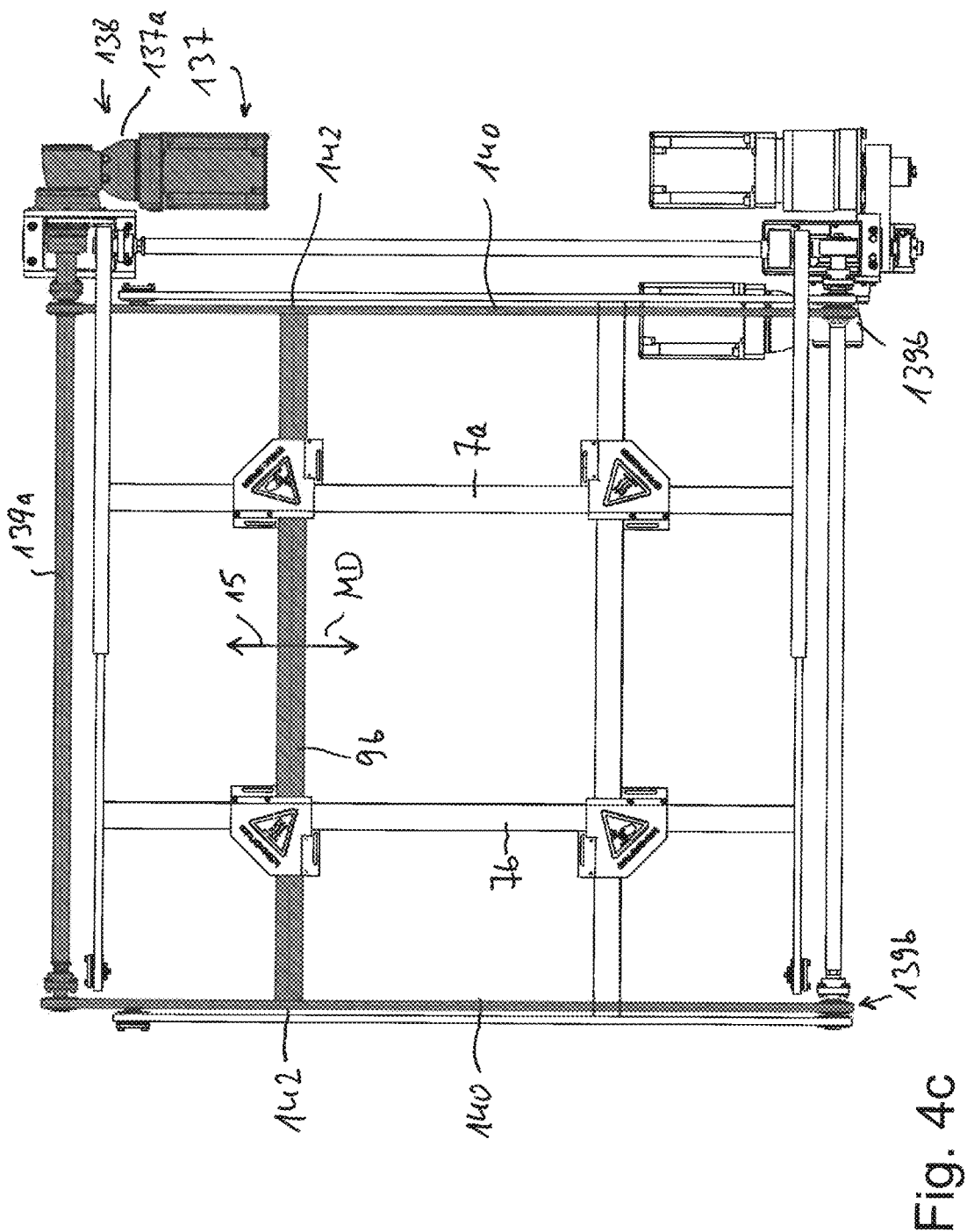

In this case, one guide rail 7a is fixed on the lower run 34a, and the other guide rail 7b of the first guide rails 7a 7b is fixed on the upper run 34b of the second transmission means 34, for example, respectively via a follower 28 (see FIG. 4c). This has the consequence that, when the transmission means 32 is driven by the drive motor 31 in the circulation direction, depending on the rotation direction, the two first guide rails 7a, 7b are moved apart or towards each other, when the motor (or a subsequent gear) is rotating in the opposite direction according to the double arrow 13 within the stretching frame 5. In this case, the variant according to FIG. 4a, for example, may be indicated as an adjustment in the transverse direction, i.e. in a transverse direction or TD direction for short.

An adjustment device that is comparable in this respect is also provided for the two second guide rails 9a, 9b, which run perpendicular to the first guide rails 7a, 7b.

However, if a drive identical to that explained in FIG. 4a were to be provided for the two further guide rails 9a, 9b, only a symmetrical adjustment of the respective two pairs of guide rails 7a, 7b and 9a, 9b would be possible outwardly or towards each other with respect to the centre in the direction of the centre of the stretching frame.

In order to achieve significant advantages in the context of this invention, a second and third drive means are provided for the two other second guide rails 9a and 9b, which are movable for example in the machine longitudinal direction (MD) in order to adjust the two guide rails 9a and 9b separately and not only to and from each other but for example in the same direction on one side of the stretching frame.

In the following, with reference to FIG. 4b, the drive and adjustment device for one of the two further guide rails will first be shown and described, namely, for example, the guide rail 9a.

For this purpose, also starting in one or more stages from a second drive motor 37 with the gear 37a downstream of this drive motor 37, one or more transmission means 38 are optionally provided with one or more intermediate shafts or intermediate wheels, which may be set in rotation.

Again, two spaced apart, parallel second transmission shafts 39a, 39b, which are perpendicular to the two first transmission shafts 33a, 33b are provided, wherein the second shafts are drivingly connected to each other via a further rotating transmission means 40. Again, the transmission means 40 may preferably consist of a chain, a belt or a band of a spindle or the like.

The two transmission means 40, which are formed, for example, by a circulating chain, are positioned at a lateral distance from each other near the stretching frame edge and are driven via the continuous shaft 39a by the drive motor 31. Instead of a second transmission shaft, only two deflection wheels 39b may also be provided here, as shown in FIG. 4b.

In the schematic representation according to FIG. 4b, the motor 37 drives, via its motor or output shaft 37a, a subsequent transmission means 38, an optionally provided intermediate shaft 37b (for example, parallel to the motor output shaft 37a), in order, for example, to set the first transmission shaft 39a in rotation. This transmission shaft 39a is then rotatably connected, via the circulating transmission means 40 engaging the two opposite end face regions of the transmission shaft 39a at the beginning and at the end, the transmission means circulating via a further transmission shaft 39b or simply by means of circulating wheels 39b, as shown in FIG. 4b, at a distance from the transmission shaft 39a.

Also in this embodiment, one of the two second guide rails 9a, 9b is fastened either to the lower run 40a or to the upper run 40b of the circulating transmission means 40, again preferably via a respective follower 42, so that when the drive motor 37 is rotating in a rotation direction, the cited first guide rail 9a of the two second guide rails 9a, 9b is either movable in the direction of the centre 17 or away from said centre towards the edge of the stretching frame, in particular according to the double arrow 15. This adjustment direction can then also be defined, for example, as an adjustment in the machine direction MD.

A third drive means for the separate adjustment of the second guide rail 9b of the second guide rail pair 9a, 9b is now shown and described with reference to FIG. 4c, the parts required for this also being highlighted again in a darker colour.

In other words, for this purpose, a second drive means 137 is provided in the form of a motor, which is optionally provided with a downstream gear 137a or a downstream transmission means 138, which in turn can rotate a first transmission shaft 139a, in particular depending on the direction of rotation of the motor in one or in the opposite direction.

At each of the two opposite end regions of this transmission shaft 139a, a circulating transmission means 140 is again provided, which may again consist of a chain, a belt, a band, a spindle or the like.

During rotation of the transmission shaft 139a, the corresponding transmission means 140 is driven in one or in an opposite direction, whereby this circulating transmission means 140 rotates at the opposite end to the transmission shaft 139a via a second shaft provided thereon or only via separately provided drive wheels 139b.

Again, the corresponding guide rail 9b is attached via a follower 142 either to the upper or to the lower run of the circulating transmission means 140, so that ultimately, when the third motor and drive means 137 is driven, depending on the direction of rotation and thus on the direction of rotation of the transmission shaft 139a, and on the two subsequent transmission means 140, the guide rails 9b are movable, according to the double arrow 15, either in the direction of the centre of the stretching frame or away from the centre of the stretching frame, within the stretching frame.

It is important that the guide rail 9b can be adjusted independently from the guide rail 9a by the third drive unit 137. In other words, the second and third drive means 37, 137 are adjusted so that, for example, the two mutually parallel guide rails 9a, 9b can be adjusted towards each other, while reducing the distance from one another, or can be moved further away from each other, similarly to the two guide rails 7a, 7b. By means of the separate drive means for the two guide rails 9a, 9b there is also the possibility that, for example, both parallel guide rails 9a, 9b can be adjusted in the same direction, not only while maintaining their respective distance from each other, but also by reducing their distance from each other, as will be discussed below.

With such a structure it would be in principle possible, for example in the schematic plan view according to FIG. 5b, to provide the stretching frame with a plate, sheet, film or membrane or web-shaped or fabric-type plastics material portion 41 to be stretched (wherein hereinafter in the embodiments reference is often made briefly to a 'film portion', without actually limiting the invention only to a 'film portion'), i.e. in a position, in which the first and second guide rails 7a, 7b, and 9a, 9b are moved towards each other, until they are positioned at a minimum or at least a relatively small distance from one another, in particular preferably centrally with respect to the entire stretching frame 5. Due to this adjusted position of the guide rails 7a to 9b with respect to one another, the corresponding adjustment guides/corner connectors 29 are correspondingly transported into their joined position, wherein in this way the clips 19 provided between the adjustment guides/corner connectors 29 are adjusted via the link chain 21 into their starting position, in which the lateral distance between two clips 19 is reduced to an extremely small or even a minimum possible distance. It is even possible that the individual clips are in lateral contact with each other.

Starting from this position, which is also referred to as the starting position SP in the following, the two first and the two second guide rails 7a, 7b and 9a, 9b could then be moved by the correspondingly described motor drives 31, 37 and 137 into a spaced apart position, whereby the corresponding adjustment guides/corner connectors 29 are moved outwards with respect to the respective mutually perpendicular portion of the guide rails and the intervening clips are increasingly displaced by the link chains 21 into mutually distant positions, as shown schematically with reference to FIG. 5c. The position in which the stretching process is ended is referred to hereinafter as the end position EP. In other words, the actual stretching process takes place between the starting position and the end position, even if after the end position, a post-treatment (annealing) may be performed, in which the film, for example, is subject to a certain relaxation and the distance of the respective opposing clips and thus the distance of each of the pairs of opposite guide rails is again slightly reduced. The final position which is achievable thereby is also referred to as the post-treatment position. However, the actual stretching process is—as will be discussed later—carried out under appropriate heat treatment in one or more of the ovens provided.

Figure 5A:
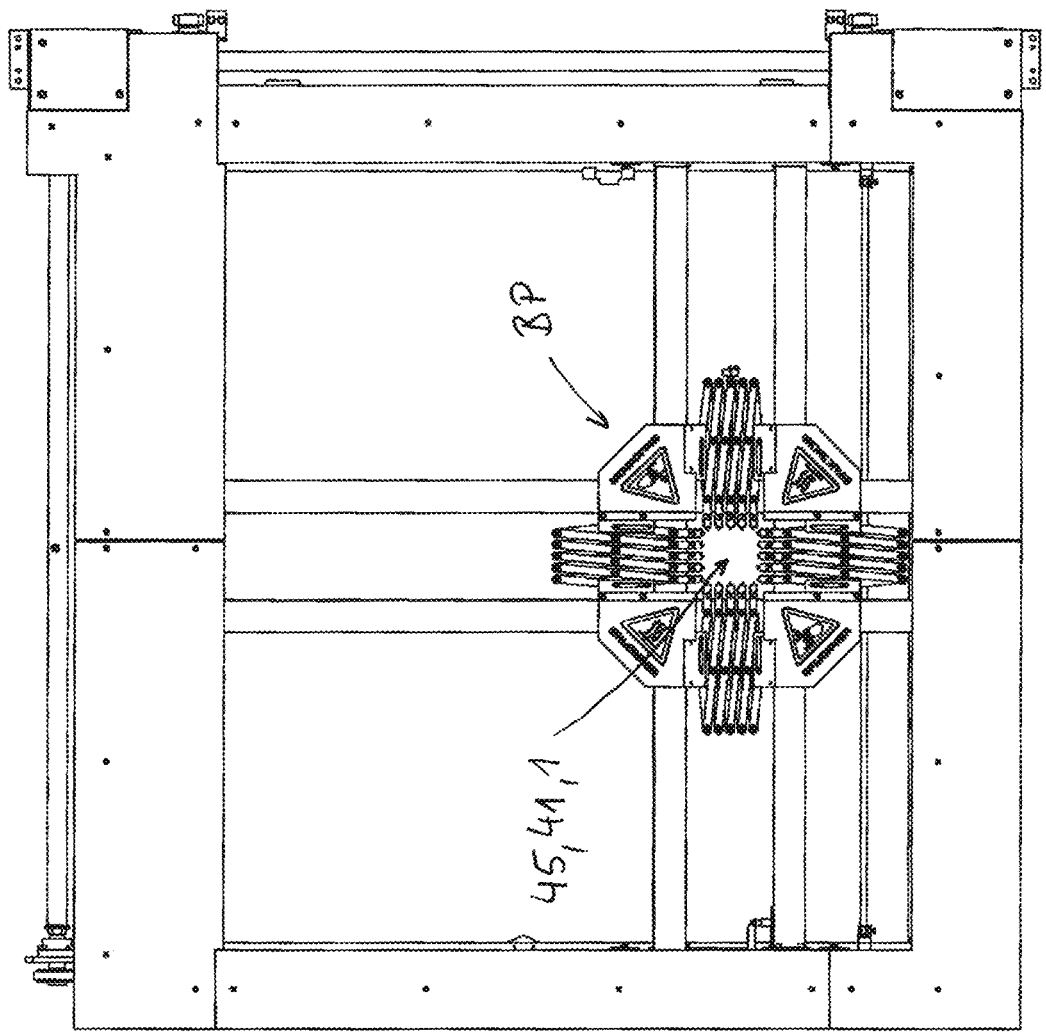
FIG. 5a, 5b, 5c are three schematic plan views of the stretching frame according to the invention, in particular in its off-centre position, its central starting position at the beginning of a stretching process and at the end of the stretching process.
Figure 5B:
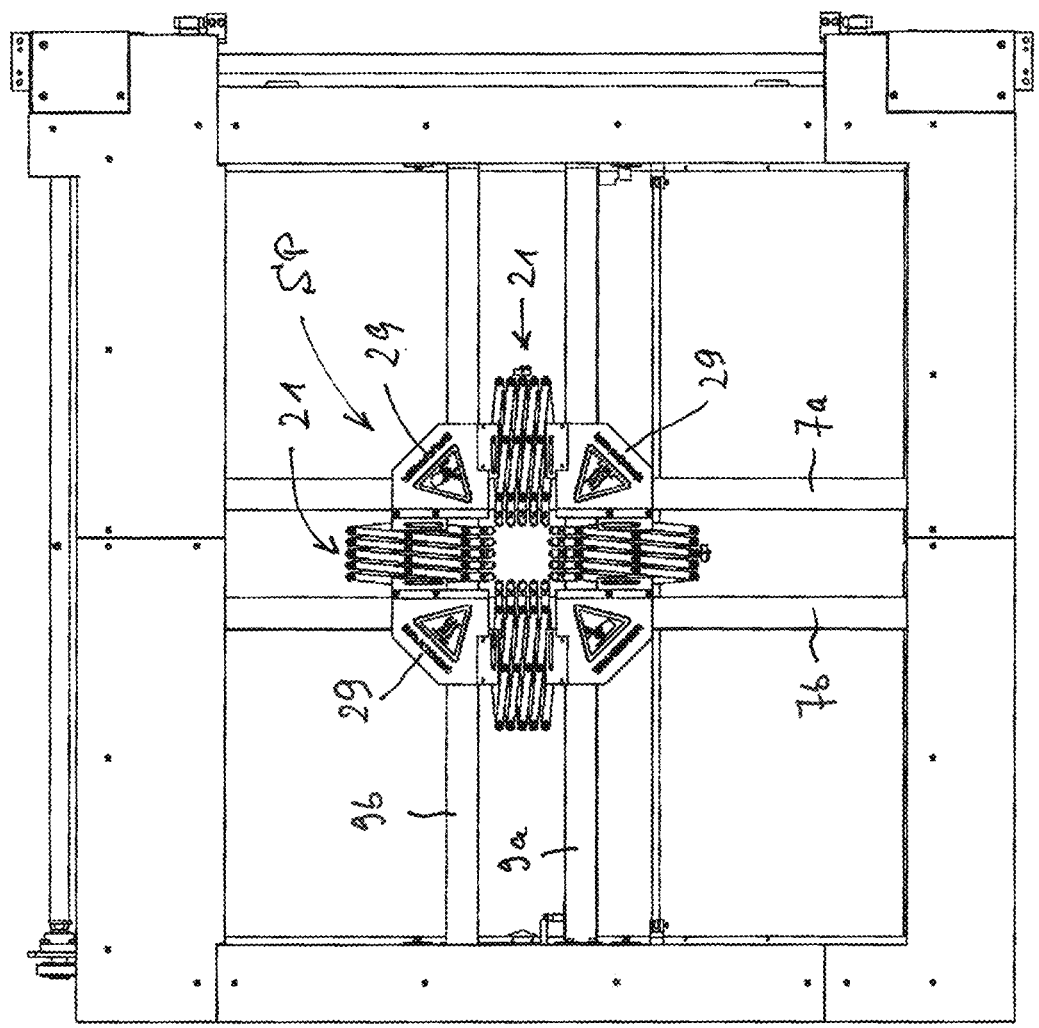
Figure 5C:
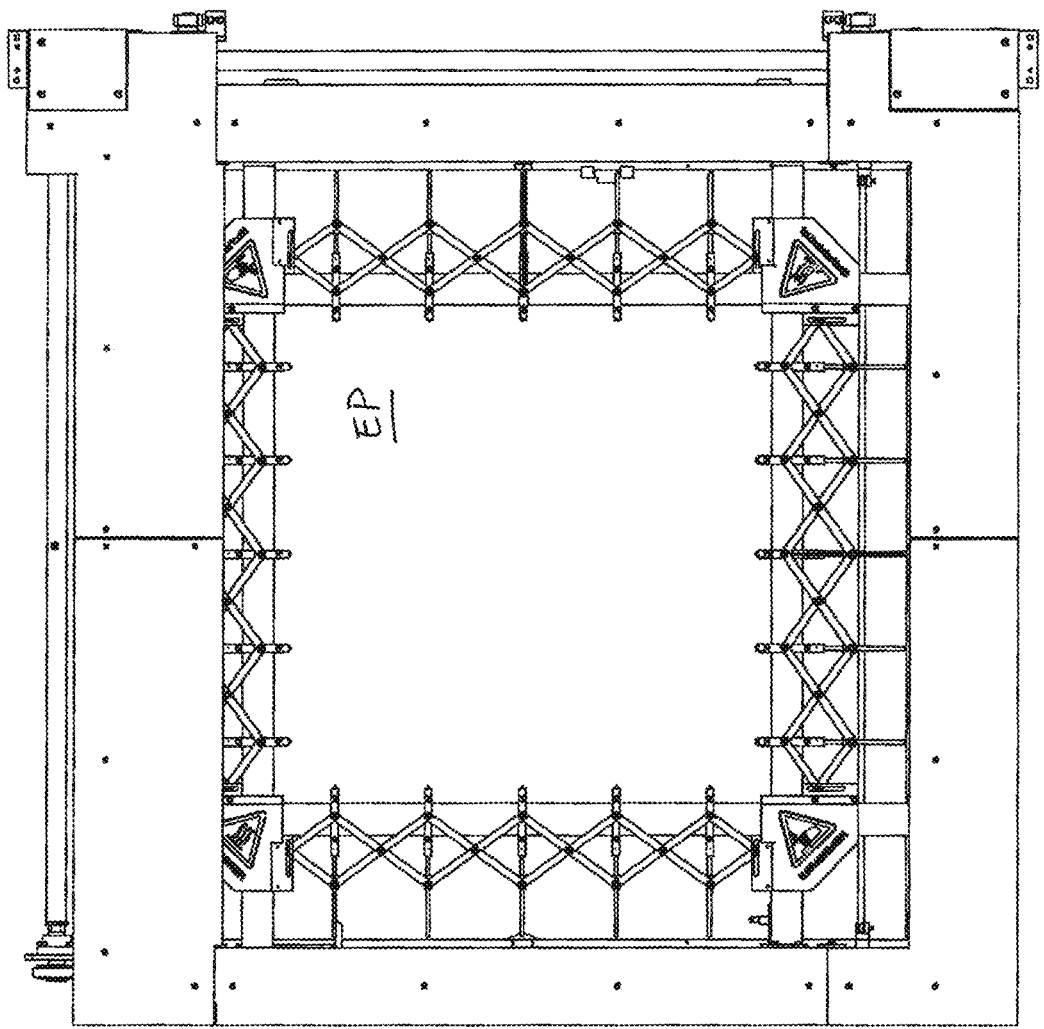

Although it has been found that a symmetrical stretching of a flat plastics body, that is, for example, a plate, foil, film or membrane or fabric-like plastics material, such as those described with reference to FIG. 5b to FIG. 5c, is fundamentally advantageous, this method has some drawbacks, at least at the time of providing the stretching frame with a plastics material portion 41 to be stretched, insofar as an operator must lean far over the stretching frame to insert a corresponding film portion 41 between the clips, which are preferably positioned peripherally in the manner of a square, before said portion is anchored and held by closing the clips.

Therefore, according to the invention, in particular before the beginning of the stretching process starting from the preferred representation of FIG. 5b, at least either the first or the second guide rails are to be moved into a loading position BP, only for loading into the stretching frame 5, as shown with reference to FIG. 5a in a schematic plan view. In this position, a plastics material portion 41 to be stretched, which is usually flat or plate-like, may be inserted into the loading area 45 delimited by the clips 19. Thereafter, the material edge of the plastics material portion 41 to be stretched is firmly clamped by means of the clips (FIG. 5a).

In the embodiment shown, both the second guide rails 9a and 9b, are thus preferably driven by two separate motors 37, 137, namely, for example, via a separate rotating transmission means 40 or 140.

This achieves better ergonomics. The advantage is that, for example, the guide rails, which are also referred to for example as longitudinal stretching guide rails or MD guide rails 9a, 9b for short, may be moved and positioned further forwards in the overall system, in order then to perform the loading of a plastics material portion 41 to be stretched. As mentioned, the common adjustment in one direction for both guide rails 9a, 9b is thus implemented with the aid of two individually controllable motors 37 and 137. For a uniform force transmission the drive trains can be designed as similar as possible. In other words, the two motor gears 37a and 137a and the associated drive trains 37 and 137 may be designed for half the required force or power, since in each case they only have to adjust one guide rail over which the corresponding stretching forces have to be applied to the plastics material portions to be stretched. The additionally provided drive train for the two guide rails 7a and 7b extending perpendicularly thereto, which can only be moved together towards each other or moved away from each other together during the stretching process, in contrast, also require a stronger motor, like in conventional drive means, which is designed to generate opposite stretching forces acting on both guide rails. Instead of or in addition to a more powerful motor, a transmission with a different ratio can also be selected. The use of two separate drive means for the two separately movable guide rails 9a and 9b results in a better weight distribution and possibly lower overall load, for example on the bearings.

Which of the two pairs of guide rails are adjustable in one direction at the same time is basically irrelevant. It is sufficient if, when loading the sample, the clips 19 are positioned in a mutually close position, as near as possible to the edge portion of the stretching frame 5, so that a corresponding adjustment movement of the two other guide rails 9a, 9b in a common direction is not required (although this can be provided).

By comparing the loading position BP according to FIG. 5a and the centre position according to FIG. 5b, which generally represents the starting position SP before the beginning of the stretching process, it can thus be seen that the loading area 45 delimited by the various clips 19 (while assuming the loading position BP) may be moved away from the centre 17 towards an outer edge boundary 5b of the stretching frame 5, such that the film area 45 in its loading position BP does not overlap or only slightly overlaps the loading area 45 when assuming the starting position SP, or as in the embodiment shown in FIGS. 6a and 6b they even come to lie at a distance from each other (FIGS. 5a and 5b).

From the above, it can be seen that the loading area 45 or the film portion 41 to be inserted therein assumes a position and/or covers a surface in the loading position BP before the stretching process is carried out in plan view of the stretching unit, which position is free from overlap with respect to the surface of the film portion 41 in the starting position SP or which overlaps only within a partial area, which is less than 80%, in particular less than 70%, 60%, 50%, 40%, 30%, 20% or less than 10% of the area of a plastics material portion 41 to be stretched before carrying out the stretching process.

If and how a plastics material portion to be stretched would overlap in its loading position BP the area occupied by the same plastic material portion, if this plastic material portion were to be moved from its loading position BP into its starting position SP, depends also on the size of the film sample, i.e. the size of the plastics material portion. Corresponding plastics material portions may for example vary from 2 cm×2 cm to 20 cm×20 cm. In other words, the respective sample of a plastics material portion which is to be stretched, may thus have a minimum edge length, for example, of 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm or of 19 cm or conversely have a maximum edge length of 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm or 19 cm or 20 cm.

If an odd number of clips is used on each guide rail 7a to 9b, then the clip 19, 19a seated on each guide rail in the centre is essentially unmovable in the longitudinal direction of the respective guide rail (FIGS. 3a, 3b and 5c), although they are basically positioned in a movable manner on the respective guide rail. This is because the respective guide rails move during the stretching process in pairs symmetrically with respect to the middle point/centre 17 away from each other so that the respective central clip 19a on the guide rail largely maintains its position so that it is aligned to the centre 17.

In contrast to the above-mentioned embodiment using an odd number of clips, it is basically equally possible to use an even number of clips on each guide rail. The two central clips would then also move by a certain distance along the guide rail when moving apart the individual clips. Ideally, five to seven clips per guide rail are used. It is possible nevertheless to deviate from these requirements. Although even fewer clips would be possible, preferably five to 10 clips per guide rail would be used.

As mentioned, it is preferable that five or seven clips are provided on each guide rail, wherein the maximum mechanical loading can be, for example, equal to 2000 N/axis, or per guide rail. This means that the load is either 400 N/clip (in the case of five clips) or 285 N/clip (in the case of seven clips). In this case, for example, the maximum stretching ratio can be 1:10.4 and the stretching speed can be adjusted continuously between 1 and 500 mm/sec. But these values can vary accordingly.

Figure 6:
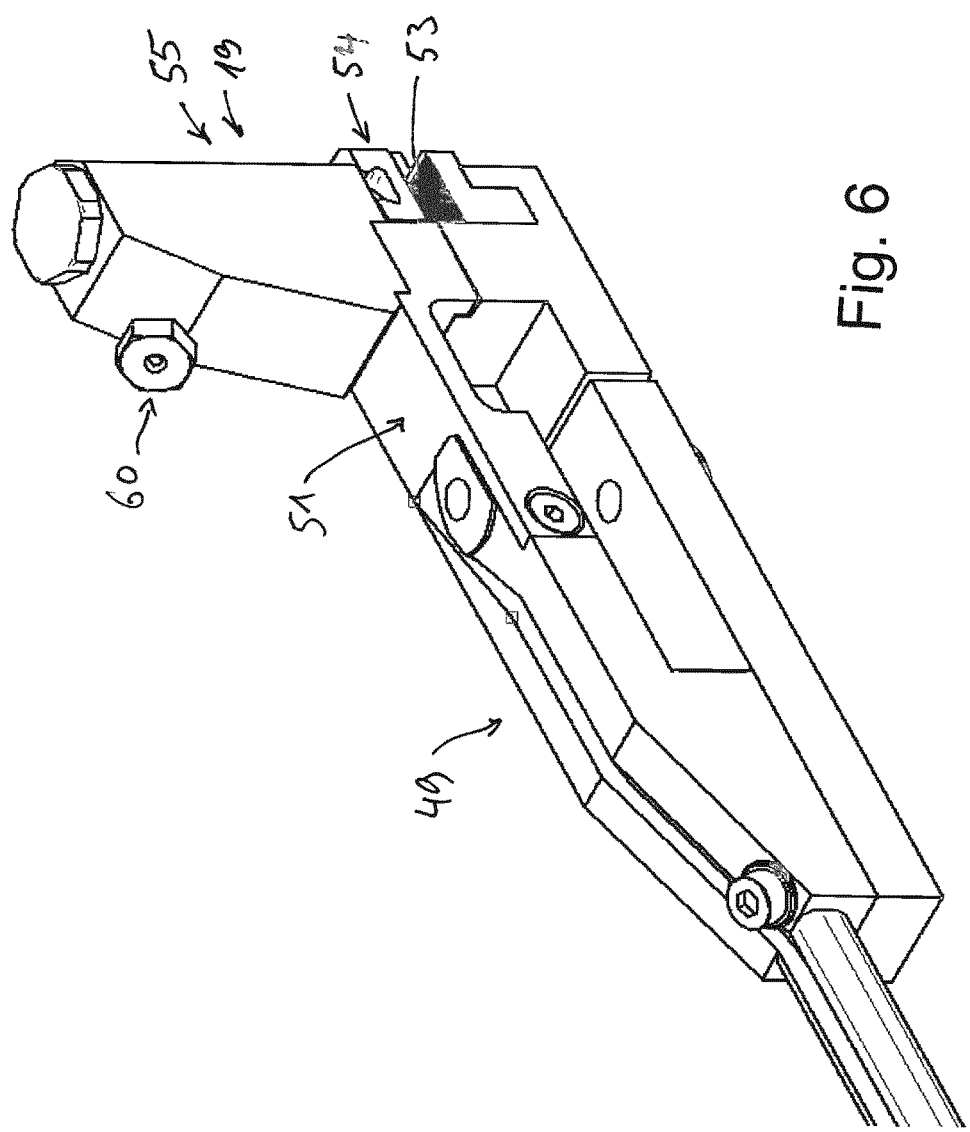
FIG. 6 is a spatial side view of a clip with an associated support and measuring device for measuring the stretching forces applied to the clip.
Figure 7:
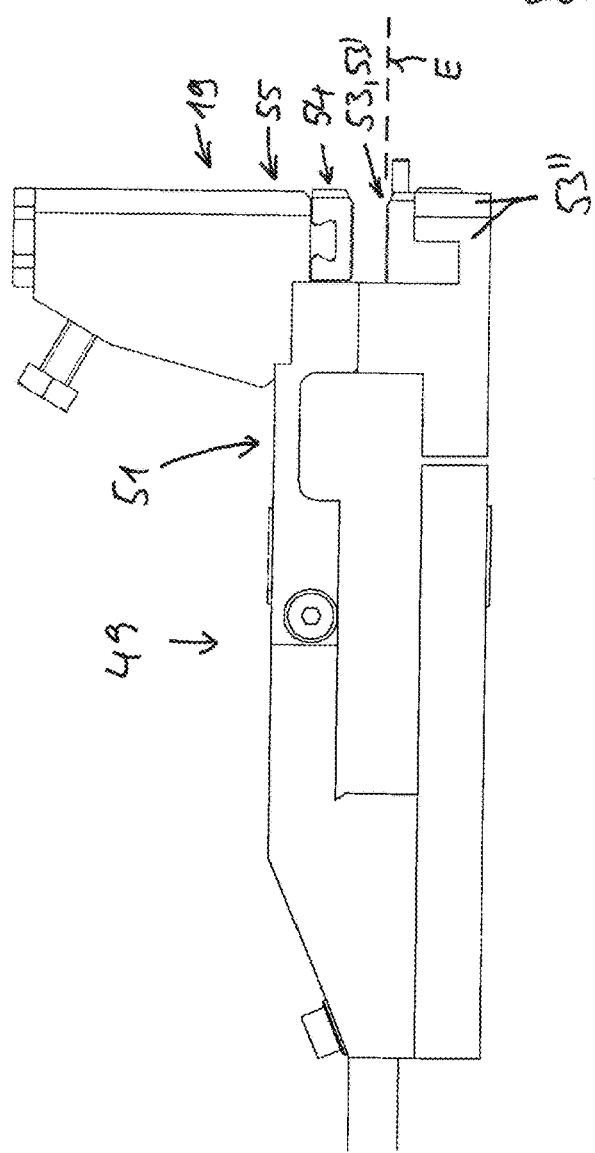
FIG. 7 is a corresponding view to FIG. 6, in a schematic side view.

A clip 19 with an associated bearing and support structure 49 is shown schematically in FIG. 6 in a slightly perspective side view and in FIG. 7 in a precise side view, here for example, with an additionally provided force-measuring device 51. However, this force-measuring device 51 is not necessary, which means that there can be clips with and without a force-measuring device 51 on the guide rails.

The clip arrangement itself normally comprises a clip body or in general a clip 19 having a first, usually lower clamping bracket 53 whose contact surface faces upwards, and a second upper clamping bracket 54, the contact surface of which faces downwards. This second or upper clamping bracket 54 is preferably interchangeably attached to the lower side of the clip clamping arrangement 55, so that the second or upper clamping bracket 54 can be moved towards the lower clamping bracket 53 (and/or is pivotable), in order to fix and clamp the corresponding edge of a material portion to be stretched in the clamping position.

Figure 8:
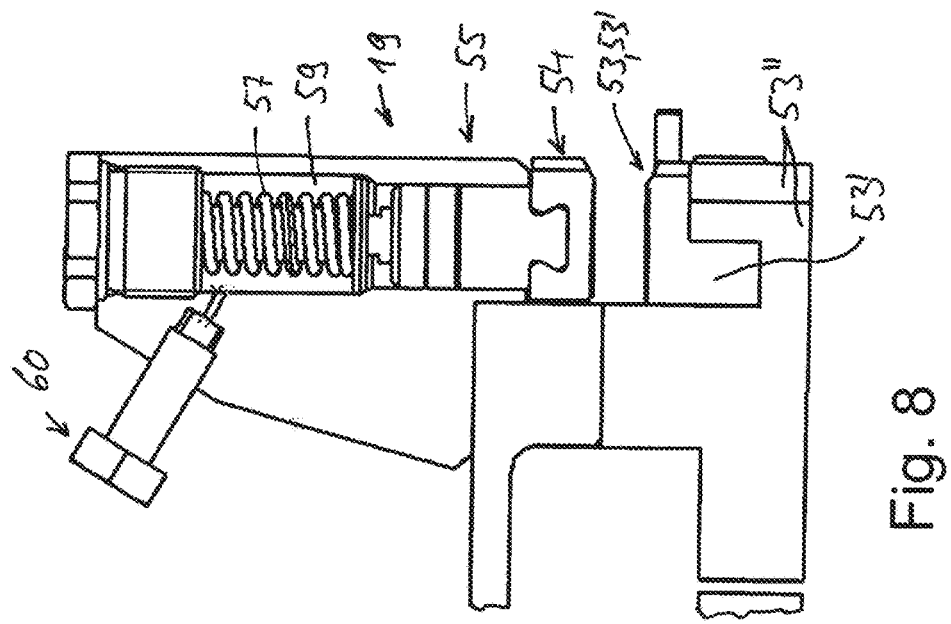
FIG. 8 is a partially enlarged view of FIG. 7 in a partial vertical section.

As can be seen in the schematic representation in FIG. 6, 7 and the enlarged detailed representation according to FIG. 8, the respective clip clamping arrangement 55 is biased by a spring force means 57 in the open position, so that the edge of the plastics material portion to be stretched is released in the absence of a counterforce.

To carry out the clamping process, a corresponding piston chamber 59 is pressurised with a pressure medium, wherein the pressure of the pressure medium is so great that the clip clamping arrangement 55 is moved against the force of said spring means 57 from its raised release position into its lowered clamping position. If the piston chamber is again vented or relieved of pressure, the clip clamping arrangement is raised again by the spring force means 57 into the release position.

The corresponding pipe connection 60 to a pressure medium line for applying pressure to the piston chamber 59 is shown in FIG. 8. Pressure lines or compressed air lines or nitrogen lines are provided in principle and lead to all of the clip bodies, for example to the pipe connection 60 shown in FIG. 8. Pressure lines 63 are not shown in FIGS. 6, 7 and 8, but are shown for example in FIG. 3b.

Furthermore, it can also be seen from FIGS. 6 and 7 that the entire clip body with the clip clamping device 55 and the first or lower clamping bracket 53 is held via the supporting and carrying device 49, which is ultimately connected to the scissor grid 21 and guided over it.

The clip supporting device 49 is connected via the portion which receives the force-measuring device 51 to the actual clip arrangement (i.e. with the lower or first clamping bracket 53, the clip with the clip clamping arrangement 55 and the upper or second clamping bracket 54 fixed thereto). The force-measuring device 51 can in this case also comprise or be formed from a bending gauge BMS, a strain gauge or, for example, an optical waveguide fibre LWL. The measuring systems are not limited. In other words, all suitable measuring systems can be used. The alignment of the mentioned force-measuring device 51, in particular in the form of a bending measuring strip, a strain gauge or an optical waveguide, is preferably arranged parallel or at an angle which is smaller than 90°, in particular less than 80°, 75°, 70°, 65°, 60°, 55°, 50°, 45°, 40°, 35°, 30°, 25°, 20°, 15°, 10° and less than 5° with respect to the plane E (FIG. 7) of the film portion to be stretched, thus preferably more or less parallel or substantially parallel to the plane E of the film portion to be stretched, whereby relatively accurate measurements can be determined. It can be seen from the side view according to FIG. 8 that a lower portion of the bearing and supporting device 49 for the clip 19 is separated by a gap, so that the entire support takes place only via the force-measuring device 51 in order to achieve a high measuring accuracy.

Reference will also be made in the following to FIG. 9, which shows a spatial representation of a detail of a guide rail 7a, 7b or 9a, 9b with a remaining small detail of the link chain 21 and especially the clips positioned on the guide rails.

Figure 9:
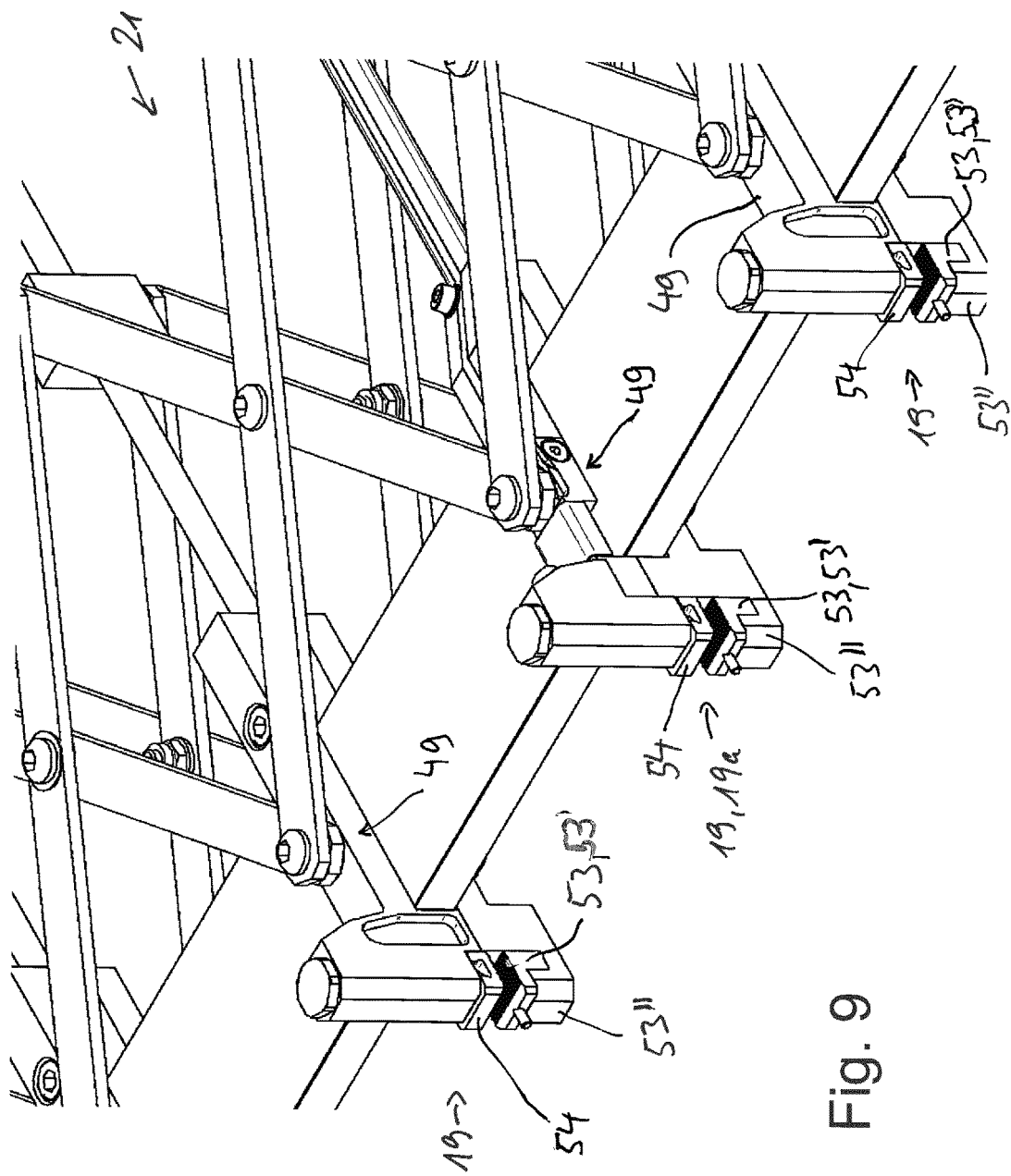
FIG. 9 is an enlarged detailed spatial view of a clip arranged on a link chain, which is movable on a guide rail.

It can also be seen in FIG. 9 that the clip 19a preferably arranged in the centre differs with respect to its bearing and support structure 49 from the bearing and support structure 49 of the other clips and clip bodies 19, because the mentioned force-measuring device is preferably only provided or formed in the region of the central clip 19a, and the clip bodies 19, which are laterally offset out of the centre with respect to a guide rail 7a, 7b or 9a, 9b do not require further force-measuring devices.

In contrast to the embodiment shown, the mentioned force-measuring devices, regardless of their design and type, may of course also be provided at a plurality of and/or at different positions or may be formed differently or additionally at other clips. Furthermore, it would also be conceivable that, for example, only one or only two clips would be provided with a corresponding force-measuring device in the overall system.

Finally, it is noted at this point that to improve the clamping action between the clamping portion of the clip clamping arrangement 55 and the clip table, the corresponding pressing and clamping surfaces of the pressing portion of the clip clamping arrangement 55 and the bearing surface of the clip table can be designed differently. With reference to FIG. 8, 9 it is already apparent that, for example, on the lower side of the height adjustable clip clamping arrangement 55 the mentioned upper or second clamping bracket 54 can be mounted interchangeably. This is preferably done via a form-fit and/or a force-fit. In the embodiment shown, a corresponding clamping bracket 54 for attachment to the lower side of a clip clamping arrangement 55 is provided with a groove-shaped recess 81 which comprises, at the two opposite longitudinal sides, an undercut 83, in which a corresponding portion of the lower side of the clip clamping arrangement 55 may engage.

The form of the various upper clamping brackets or clip contact portions 54, which may be moved with the clip clamping arrangement 55 towards or away from the lower brackets 53, is briefly explained below with reference to some of the drawings.

Figure 10A:
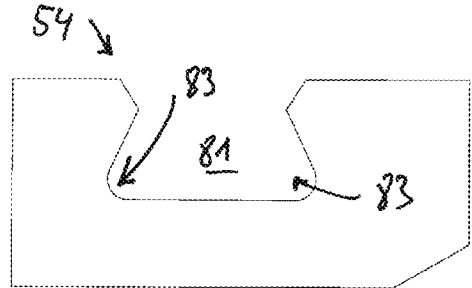
FIGS. 10a to 10d are four schematic representations of different clamping brackets, which may be interchangeably positioned on the lower side of the clip clamping device, with different clamping surfaces or contact areas.
Figure 10B:
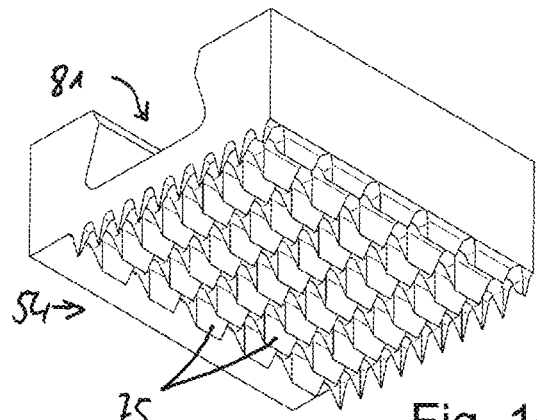
Figure 10C:
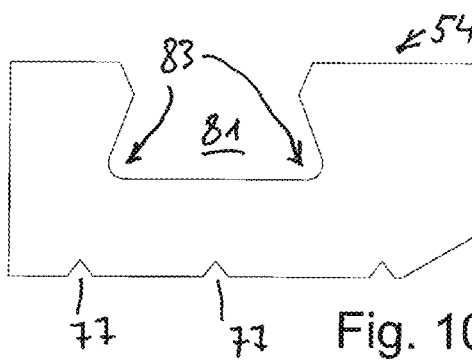
Figure 10D:
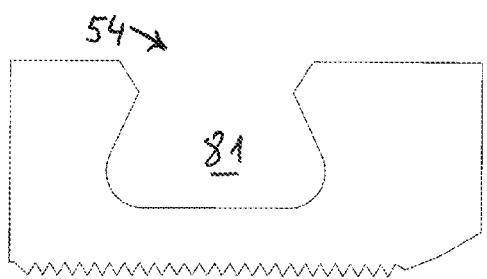

With reference to FIGS. 10a to 10d, schematic cross sections of different examples for the downwards facing contact side or contact surface 71 of the upper clamping bracket 54 are shown. It can be seen that the actual clamping or contact surface 71, with which the edge of a rather flat plastics body is sandwiched in cooperation with the lower clamping bracket 53, for example, may consist depending on the material of a more or less smooth surface or of an at least slightly chiseled or roughened clamping surface 74 (FIG. 10a), or may comprise a plurality of downward protruding clamping teeth or clamping tongues 75 (FIG. 10b). Also possible is the formation of mutually spaced and parallel or intersecting grooves 77 which may be, for example, V-shaped in cross section (FIG. 10c). It is also possible to provide the formation of a plurality of clamping ribs 79 which extend in a direction parallel to one another, preferably parallel to the corresponding edge of the film portion to be clamped (FIG. 10d).

In the schematic cross-sectional views in FIGS. 10a to 10d the groove-shaped recess 81 can also be seen, which as shown here for example is provided with lateral undercuts 83, so that it can be interchangeably inserted in a corresponding complementarily shaped lower side of the clip clamping arrangement 55 on this clip clamping arrangement 55. As can be seen in particular from FIG. 8, a free adjustment path for the clip clamping arrangement 55 is provided within the clip body 19, which is cylindrical, wherein these cylinders may be adjusted in the cavity of a clip body 19 along an adjustment path, wherein in particular the mentioned pressure medium acts against the spring means 57. The clip body with the mentioned clip clamping arrangement 55 is thus piston-shaped or piston-like, wherein on the lower side of the adjusting cylinder (piston), the corresponding clamping brackets can be mounted interchangeably. It is of course also possible that other geometries are applicable in order to mount the mentioned clip contact portions, in particular by attachment or insertion, etc. Preferably, an easily replaceable connection of the interchangeable clip contact sections is provided, which can then be replaced and mounted depending on the purpose.

Due to the different design of the different clamping surfaces 73, an optimal adaptation to different plastics material portions to be stretched can be obtained, in particular as a function of the thickness of the plastics material to be stretched and/or the material composition of the plastic materials to be stretched. In this case, the different clip contact portions 65 can be selected in each case, which allow optimal fixing with respect to the plastics material to be stretched on the clip table. The embodiments shown by way of example of the different clip contact portions can be used, depending on which plastics material is to be stretched, such as, for example, a plate-shaped plastics material or a foil-like, film-like or membrane-shaped or membrane-like material or, for example, a fabric material to be stretched.

Figure 11A:
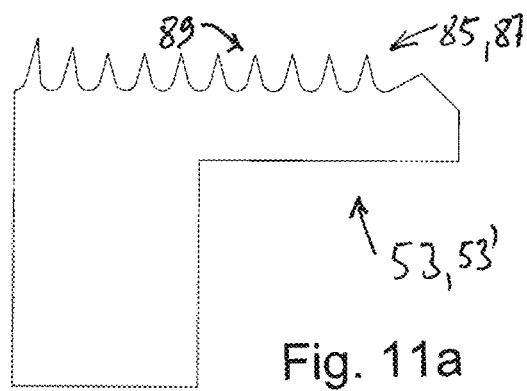
FIGS. 11a to 11d are corresponding different representations of clamping brackets, which are preferably interchangeably mountable on a clip table substructure, with different clamping surfaces.
Figure 11B:
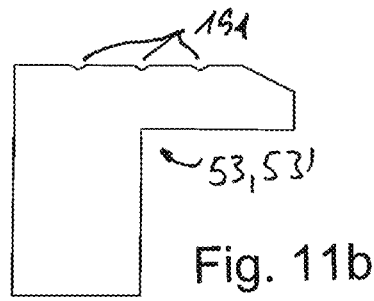
Figure 11C:
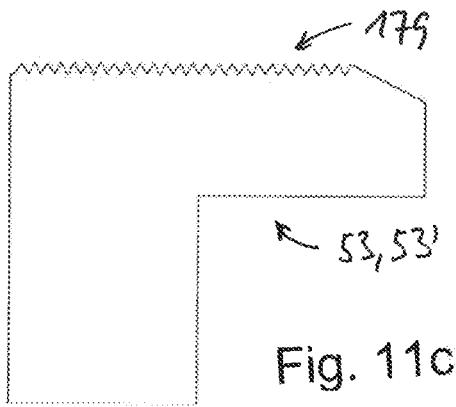

Likewise, the usually upward facing clamping side 85 may be provided, on the upper side of the lower clamping brackets 53, with a clamping surface 87, which may be designed accordingly, for example, again with a plurality of upwardly projecting teeth or ribs 89 (FIG. 11a) or a plurality of mutually parallel grooves or slots 191, which are V-shaped in cross section for example (FIG. 11b). These can preferably be parallel to the clamping edge of the film portion to be clamped, or may be offset by 90°. Moreover it is conceivable that the V-shaped grooves or slots 191 form a grid pattern. This is shown in FIG. 11b. It is also possible to use a plurality of clamping grooves 179, again preferably parallel to the film edge, as shown with reference to FIG. 11c.

Figure 11D:
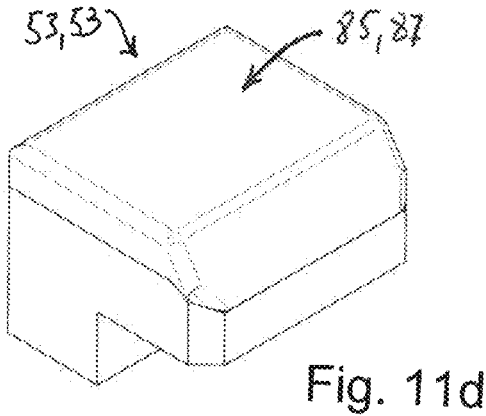

FIG. 11d shows a variant with a rubberised gripping surface 87 or upper clamping side 85.

The variants shown are only examples. There can be any number of modifications, which may be suitable for a wide variety of plastics materials and plastics thicknesses.

The mentioned lower clamping brackets 53 are preferably designed in the form of interchangeable clip-table attachment elements 53'. This has the advantage that these clip-table attachment elements 53' can be mounted interchangeably on a clip-table substructure 53" in order to be able to optimally adapt to the film portions to be stretched in order to achieve a particularly good clamping engagement. This can be seen in particular in FIG. 9, where the lower clamping brackets 53 shown by way of example with reference to FIGS. 11a to 11d in the form of the interchangeable clamping bracket attachment elements 53' are inserted or mounted on a clamping bracket substructure 53" visible in FIG. 9.

The basic structure and the basic operation of the stretching frame have been explained with reference to the foregoing drawings.

The preferred symmetrical stretching of a film portion, starting from the position according to FIG. 5b, in which the clips are moved towards one another (starting position SP) to the end position EP according to FIG. 5c, in which the clips assume a maximum or larger distance from one another, is not performed in the loading or unloading zone 1 (FIG. 1), but preferably in a first oven 3a, in which the film portion to be stretched can usually be heated to a corresponding temperature. However, it is also quite possible that the material to be stretched is to be stretched cold, i.e. stretched, for example, at room temperature.

An oven construction or oven arrangement for achieving particularly good stretching results is shown schematically in FIG. 12. The drawing in FIG. 12 shows a first and a second oven arrangement 3a or 3b, and in particular they are each provided with an oven 3'a or 3'b above the stretching frame and a further oven 3'b, or 3"b below the stretching frame plane.

Between the lower side 97 of the upper oven and the upper side 99 of the lower oven, a sufficient vertical clearance space 93 is provided, which is sufficient to move the stretching frame 5 on the guide rails, the clips thereon, the pressure lines and all attachments between the respective upper and lower ovens.

In FIG. 12, the arrangement is shown, in which the stretching frame 5 is still outside the ovens in its starting position SP (or loading/unloading position). From the drawing it can also be seen that in each case the upper oven is more or less congruent with a lower oven.

With this oven arrangement, usually a corresponding temperature regulation of the film portion to be stretched can be obtained. Preferably, the temperature is not controlled by infrared radiation (which would mean that the film portion to be stretched can be heated only after insertion into the oven), but by supplying heated air, which has already brought to an appropriate temperature before insertion of the stretching frame with the film portion to be stretched.

In FIG. 13 a view corresponding to FIG. 12 is shown, in which the stretching frame 5 with a material portion 41 to be stretched is already in the first oven arrangement 3a between the first upper and lower oven 3'a, 3"a. In this position, the stretching process would usually be carried out starting from the starting position SP to the end position EP.

Figure 14:
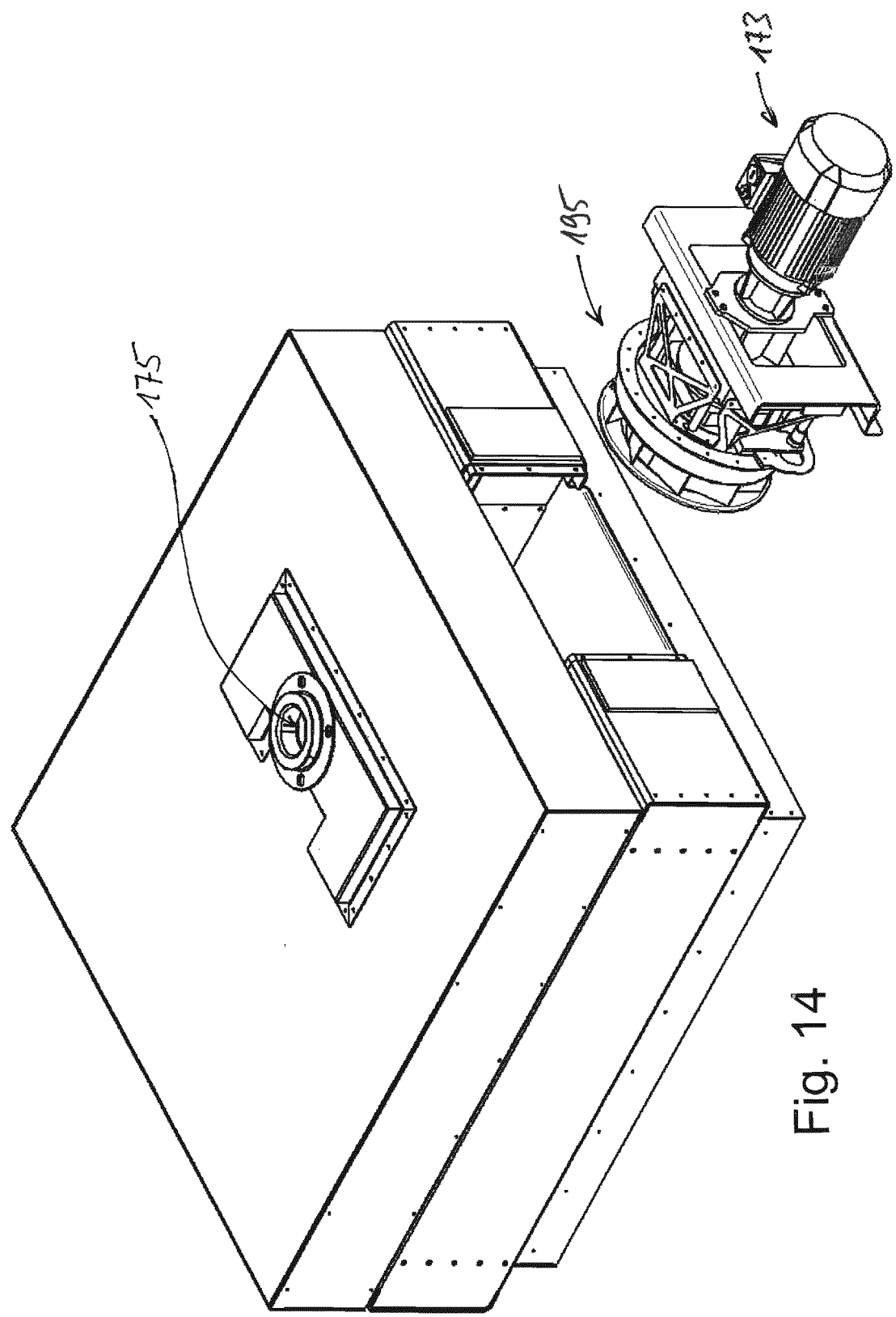
FIG. 14 is a simplified spatial representation of an oven according to the invention provided with a fan and a motor drive.

With reference to the oven arrangement, it may further be seen with reference to FIG. 14 that at least on one side of an oven (for example, in the oven 3'a or 3'b), a fan or a fan wheel 195 may be arranged within an oven chamber and is driven by an outer motor 173, preferably directly, in which the fan shaft is directly coupled to or positioned on the motor shaft. A direct drive formed in this way is thus preferably realised. In this case, in FIG. 14, the fan, the direct drive and the motor itself are shown in the disassembled position before insertion into a corresponding side wall of the oven. The air supply is provided through an opening 175. These can be installed not only in the upper ovens 3'a, 3'b, etc. but alternatively or additionally in the respective lower ovens 3"a, 3"b and so on.

Otherwise, a passive air supply may also be provided, which is however less advantageous than an active air supply with respect to the above-described direct drive. In principle, however, an active or a passive air supply for the oven can be attached to the mentioned opening. In principle, the oven requires an additional air supply, as it circulates the existing air in recirculation mode.

Figure 14B:
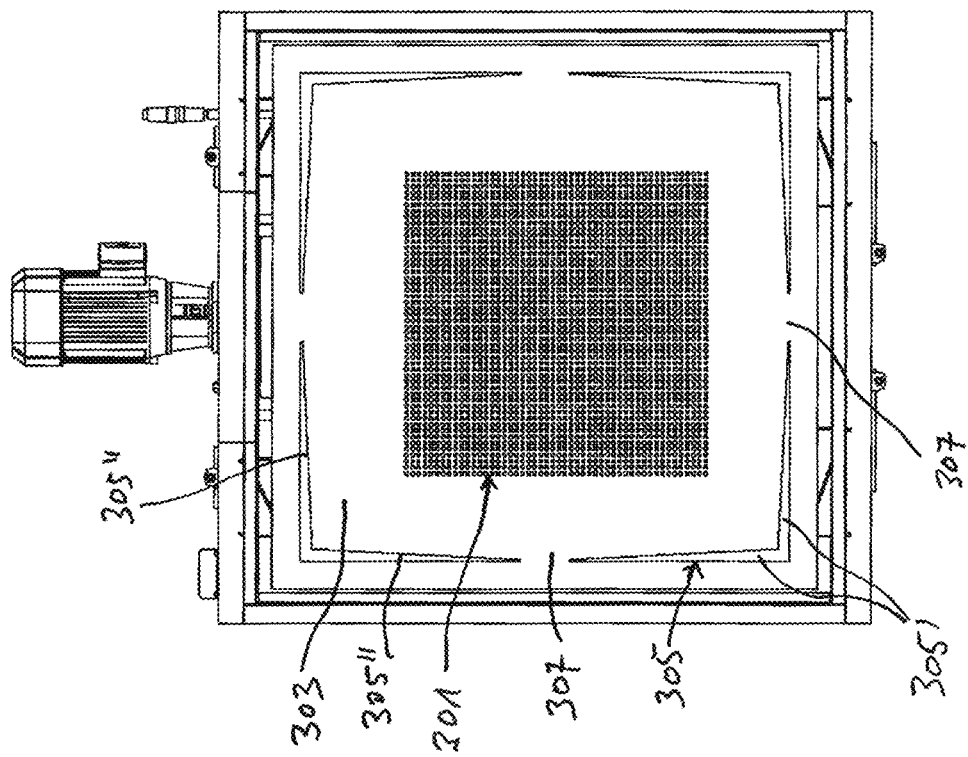
Figure 14A:
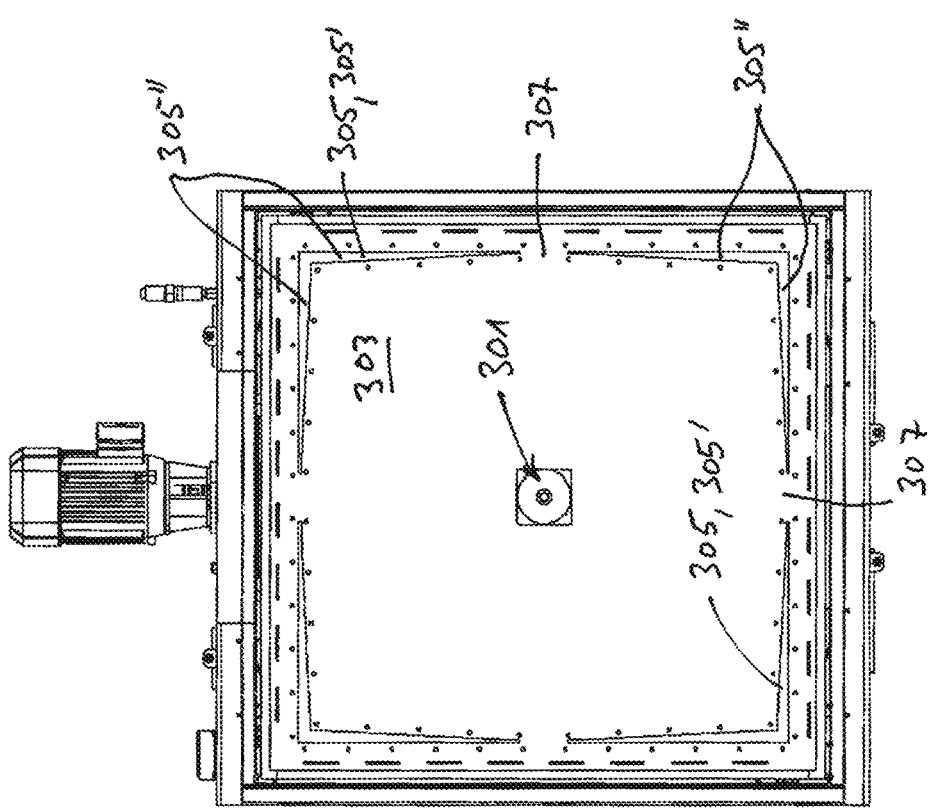
FIG. 14a is a plan view of the upper and lower sides of an oven, facing the plastics material portion to be treated, with air intake openings and an exhaust opening or exhaust zone in the direction of the still unstretched plastics material portion (in the case of a stretching oven)

In addition to FIG. 14 reference is also made to the further FIGS. 14a and 14b, wherein FIG. 14a shows a bottom direct view, for example, of a first oven, i.e. for example, of a first upper oven 3'a (or a plan view of a lower oven 3"a), and FIG. 14b shows a corresponding lower side view of a second or third oven, for example an oven 3'b or a top view of the associated lower oven 3"b, as can be used, for example, for the annealing region.

In the drawing according to FIG. 14a with regard to a stretching oven, a central exhaust opening 301 is provided in a bottom cover 303 for a focused exhaust of air, for example, on the underlying plastics material portion 41 to be stretched, which is positioned in the stretching frame, wherein the opening, dimensioning and arrangement of the exhaust opening 301 is matched to the size and location of the plastics material portion to be stretched. In other words, the exhaust opening 301 in plan view is at least approximately congruent with the not yet stretched plastics material portion.

The corresponding air, which is blown out via the exhaust opening 301 in the direction of the plastics material portion, is sucked in via external suction openings in the interior of the oven, wherein these suction openings 305 are formed in the embodiment shown in the form of angular suction openings 305', which extend with a certain length from the respective corner region, so that their width extension thereby decreases from the corner region to the outlet end. The length of each leg of the angular suction opening 305' is smaller than half the length of the stretching frame, so that in each case a material portion 307 remains, which separates the mutually facing ends of the angularly disposed suction leg opening 305". This results in a symmetrical suction with a sufficient cross-sectional opening, so that air coming from outside over the entire interior of the oven can be heated further and then emitted via the exhaust opening in the direction of the plastics material portion. In the corresponding representation in FIG. 14b, a variant is shown which can be used for example in a further oven, which comprises an annealing zone.

Again, an exhaust opening 301 is provided, whose size is now a multiple of the exhaust opening 301 in the view according to FIG. 14a, namely preferably in adaptation and according to the size and thus to the longitudinal and transverse extension of the stretched plastics material portion.

The outer angular suction openings 305 are also provided in this variant, comprising the suction leg openings 305", which are positioned at an angle to each other.

In this example as well, hot air is accordingly blown in the direction of the stretched plastics material portion, wherein the temperature control in the oven is adapted or tuned according to the intended treatment of the plastics material.

Subsequently, reference is made to FIGS. 15a and 15b, one in a schematic side view and one in a spatial representation, which show, as already described, two successive oven arrangements 3a and 3b, wherein for both upper ovens above the travel path V a respective oven having a passive air supply 198 for the stretching frame is provided (and preferably comprising the mentioned fans 195). In this case, via the openings 198 (which may possibly be provided with additional chimneys) either manually or automatically (i.e. automatically controlled), an additional active cooling for the upper ovens 3'a and 3'b takes place, as already shown, for example, in FIG. 14 with respect to the opening 175 on the upper side of a preferably upper oven. The ovens 3"a and 3"b, which are arranged below the travel path V can be provided with air via an active air supply 199, for example using air pipes and air pipe systems 199a, which may also be provided, for example, with a flap control 199b and/or a fan 199c, which for example draws air in via a motor 199d through a suction opening 199f (intake manifold 199f) and feeds it through the pipe system into the interior spaces of the corresponding ovens.

Figure 15B:
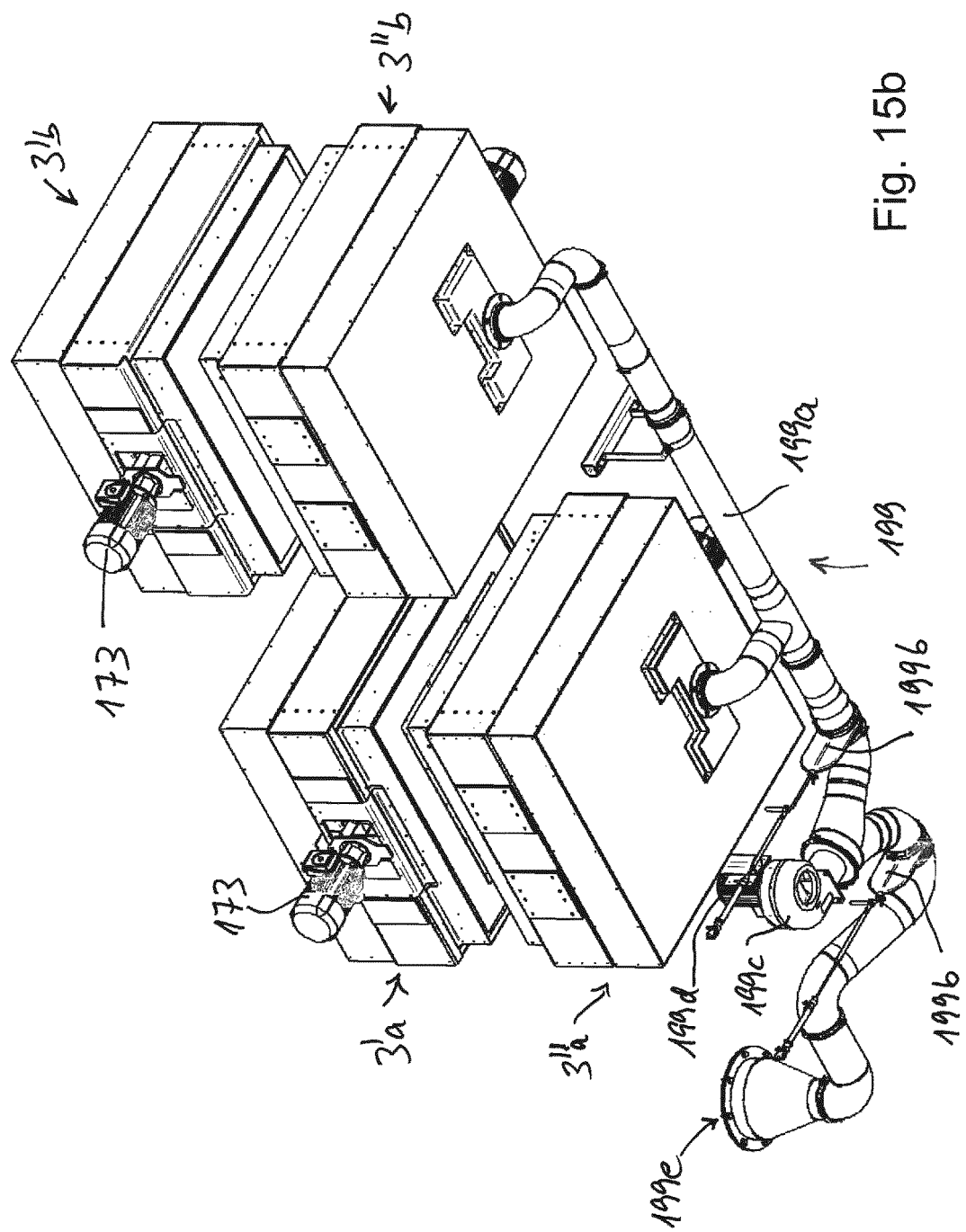

In FIGS. 15a and 15b, reference sign 199e further denotes an exhaust device which in the embodiment shown is funnel-shaped (but can also be formed in a completely different manner), wherein a cool medium, usually air, may be fed to the clips via this opening 199e, thereby causing a cooling of the clips.

In contrast to the above description, it is also possible that, for example, the lower ovens 3"a and 3"b are provided with a passive air supply, for example using the manually or automatically adjustable chimneys (see FIG. 15a), located on the upper ovens. 3'a and 3'b. These can alternatively supply additional air with active cooling.

Figure 16:
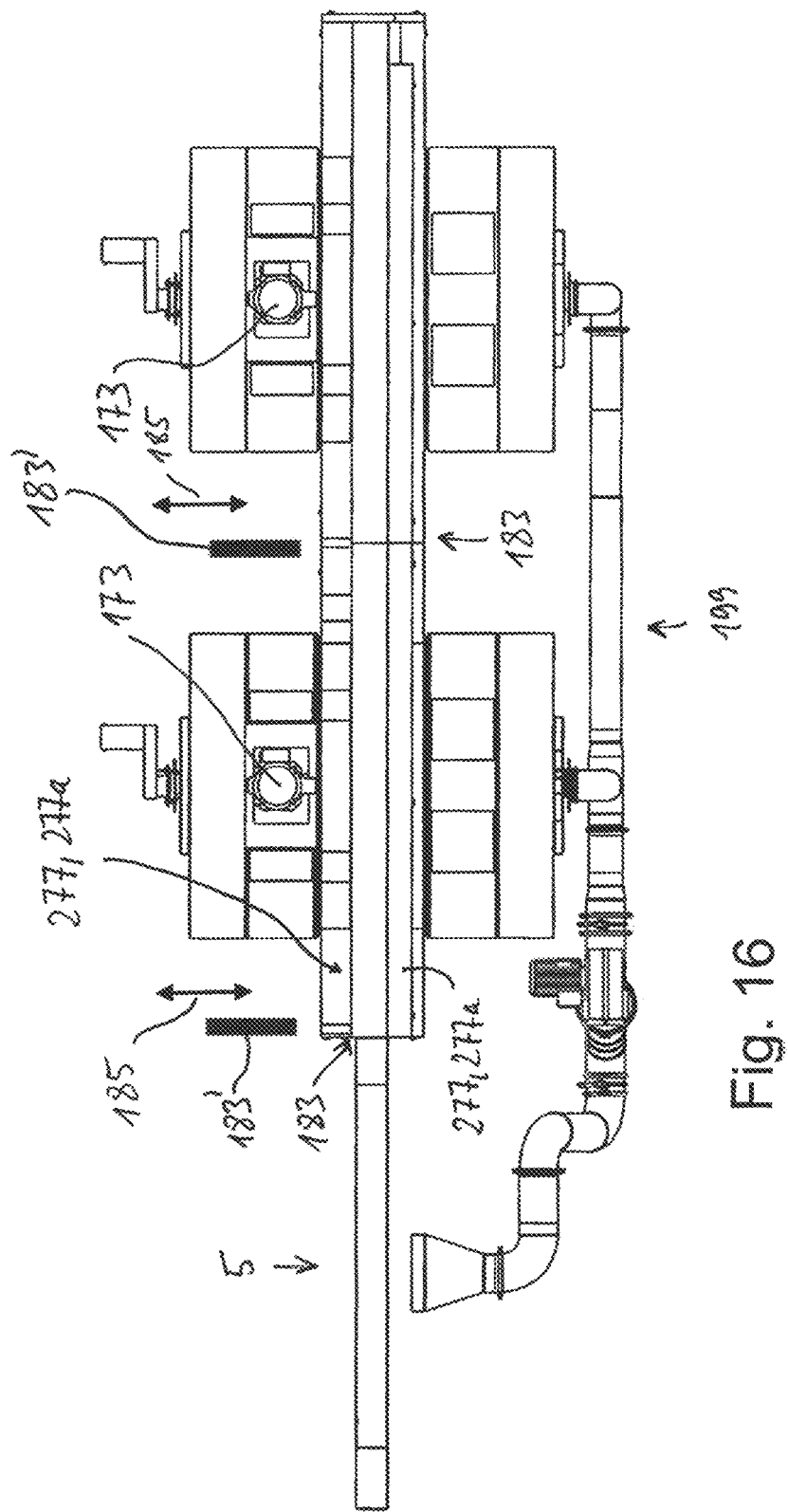
FIG. 16 is a side view of an oven showing that insulation is provided in each case between the upper and the lower ovens on both sides of the adjustment path for the stretching frame, which insulation has apertures only in the region of the ovens.
Figure 17:
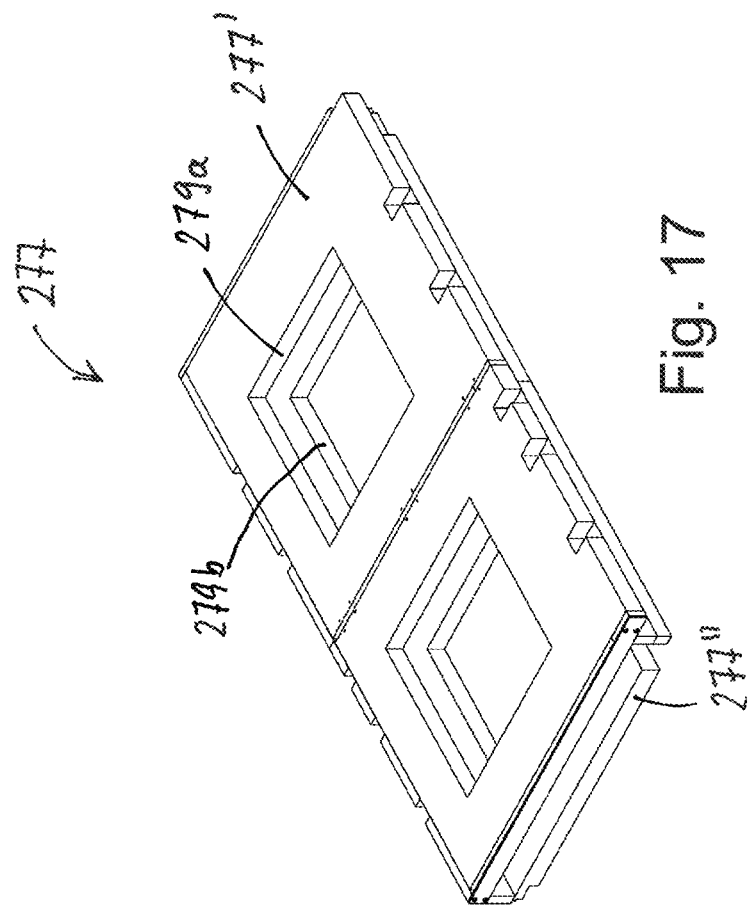
FIG. 17 is a perspective view of the insulation shown in the side view of FIG. 16, preferably in the form of insulating plates.

Based on the representation according to FIGS. 16 and 17, it is shown that corresponding successive ovens are positioned above and beneath the movable stretching frame with the interposition in each case of insulation 277, preferably in the form of insulating plates 277a, between which the actual stretching frame 5 may be moved. In addition, between the two or in general between two consecutive adjacent ovens, separation points or separation devices are provided, such as in the form of shutters 183, at which an additional insulating plate 183' may be slid into a gap provided for this purpose, in order to insulate the inlet and outlet openings in or out of the respective oven (see FIG. 16). The above-mentioned insulation 277 and in particular the insulating plates 277a are provided with a corresponding aperture at the location where the ovens are positioned above or beneath the respective insulating plate, so that the clips and the guide rails as well as above all the material portion to be stretched lie free in the respective oven, and the heating may be optimal.

The insulation mentioned serves to separate the hot air region for stretching from the rest of the machine, thereby forming a space between the upper and lower ovens.

In FIG. 17, the illustrated insulation 277 with the insulating plates 277a is shown separately in a perspective view, i.e. without the upper and lower ovens. The insulation 277 then has appropriate central openings 279a with respect to the respective upper oven 3'a, 3'b or, for example, mutually facing insulating plates 277', as well as a corresponding lower opening or recess 279b, which faces the respective lower insulating plate 277", where the lower ovens 3"a, 3"b, etc. are positioned.

Figure 18:
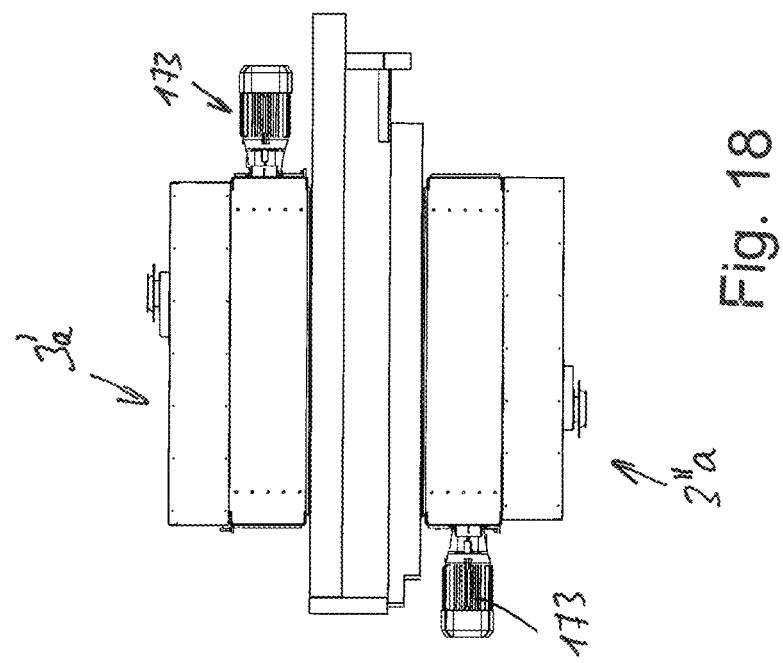
FIG. 18 is a complementary representation of an upper and lower oven with counter-rotating motors for driving fans located inside the ovens.

Finally, with reference to FIG. 18, the corresponding front view of FIGS. 16 and 17 is shown in the mounted state, for example, with the upper oven 3'a and the lower oven 3"a.

A respective first oven 3a preferably serves as a heating and stretching oven in order to bring the film portion to be stretched to the optimum temperature before and/or during the stretching process.

After carrying out the stretching process, the stretching frame can then be moved into a subsequent further oven, which serves, for example, as a post-treatment oven, in which the clips will be moved towards each other, at least to a minimum extent, in order to be able to subject the film portion to a certain relaxation. Such ovens may also be referred to as annealing zones.

In contrast to the above description, other structures or combinations of the ovens are also possible with a different purpose. For example, it is possible for another stretching oven to serve as a post-processing oven and for a third oven to be used for the annealing phase. However, it is also possible that, for example, the first oven is used for a machine longitudinal stretching (MD stretching) and a subsequent second oven is used for a transverse stretching (TD stretching), and finally if a third oven is provided, this is then used, for example, for the annealing phase.

Differing from the representation, a further oven 3c or a further oven arrangement 3c may be provided after the second oven, which is formed for example as an additional stretching zone, which further oven is used for example as a cooling zone and/or as a further annealing zone, in which the film is cooled to a certain temperature (ovens 3a, 3b, and 3c in FIG. 1b). The different ovens can be operated at different temperatures. In addition, for example, the upper ovens may have temperatures that differ from the temperatures in the lower ovens. Restrictions do not exist in this respect either.

Between the individual oven or oven zones the passage openings to an adjacent oven may be almost completely closed by shutter diaphragms. In other words, the stretching frame may be moved, in its entirety and with the film portions contained therein to be stretched, between an upper and a lower oven, wherein the side portions are sealed in parallel to the travel direction V by insulation or insulation plates, and the opening regions, positioned upstream and downstream in the travel direction V for inserting and extracting the stretching frame in and out of the oven may be closed by shutter diaphragms preferably as much as possible, i.e. preferably substantially or almost completely, in order to perform an efficient thermal treatment. In other words, the ovens are preferably formed in such a way that the corresponding shutter diaphragms in the closed position close the opening of an oven for insertion and extraction of the stretching frame at least up to 90%, in particular at least 91%, 92%, 93%, 94%, 95%, 96%, 97%, 98% or at least 99%.

Furthermore, it should be pointed out that the ovens are designed so that in each case an oven 3a, 3b, 3c is formed so that it is heated at a temperature of 300° C. +/− less than 50° C., in particular less than 40° C., 30° C., 20° C. or 10° C. and at least one other oven and/or one oven is heated at temperature of 400° C. +/− less than 50° C., in particular less than 40° C., 30° C., 20° C. or 10° C. and/or a third oven 3c is provided in particular for a second annealing phase and/or a temperature reduction or cooling.

The ovens can be heated for example by means of electric heaters in recirculation mode. For a more accurate temperature regulation, a re-adjustment may be performed, for example, using a manually adjustable air slide. If cooling is required for an oven, especially for the last oven, then preferably an active cooling system is installed for this purpose, wherein a fan can blow active air into the stretching chamber.

In conclusion, the workflow for stretching a plastics material portion by means of the inventive stretching frame is briefly described. In this case, a stretching process involves the following steps:

1. The stretching frame is in the insertion position
2. Inserting the plastics material portion onto the loading table
3. Closing the clips and clamping the plastics material portion
4. The stretching frame moves into the thermally preregulated stretching oven, wherein, for example, the plastics material portion may be heated in a targeted manner by means of diffusers (sample starting size)
5. Clips move symmetrically outwards from the centre (respectively divided into machine longitudinal and machine transverse directions); for example, different stretching samples may be handled differently. The clips are symmetrically moved away from each other and stretch the plastics material portion in each direction preferably symmetrically or if required also in two consecutive steps)
6. Depending on the material of the plastics material portion to be stretched, the stretching frame with the plastics material portion can be moved into a further annealing oven, in which further holding or stretching or relaxing of the plastics material portion at different or identical temperatures is possible.
7. The stretching frame is moved out of the oven
8. The clips are opened
9. The stretched plastics material may be removed
10. Guide rails and clips resting thereon are moved to the starting position (insertion position)

The invention claimed is:

1. A device for the uniaxial or biaxial stretching of plastics material portions, the device comprising:
a stretching frame having:
two first guide rails, which are at a distance from one another and extend in parallel and are movable perpendicularly thereto, and
two second guide rails, which are at a distance to one another and extend in parallel and are movable perpendicularly thereto,
wherein the first guide rails are aligned perpendicularly to the second guide rails and are arranged so that all four guide rails form a rectangle or a square or approximately a rectangular shape or a square in plan view,
wherein on each rail of the two first and the two second guide rails at least two respective clips are arranged, wherein the at least two respective clips are clamped to a film portion for stretching the film portion, and
wherein the two first guide rails and the two second guide rails are movable between a starting position to be moved towards one another and an end position movable away from one another such that a previously inserted and fastened film portion is stretched either uniaxially or biaxially; and
an oven arrangement, wherein:
the oven arrangement includes an upper oven and a lower oven; and a travel range for the stretching frame within the oven arrangement is insulated upwardly and downwardly with an insulation, which is positioned at a height of a lower side of the upper oven and of an upper side of the lower oven, wherein the insulation is provided with a corresponding opening region on the lower side of the upper oven and on the upper side of the lower oven.

2. The device according to claim 1, wherein the oven arrangement is part of a plurality of oven arrangements arranged one behind the other, in which in a first oven arrangement of the plurality of oven arrangements the film portion to be stretched is subject to a stretching, and that in at least one subsequent oven arrangement of the plurality of oven arrangements a post-treatment phase for the stretched film portion is performed, in the form of an annealing zone and/or a relaxation zone, in which a distance between opposite pairs of the guide rails and thus between the respectively oppositely arranged clips is slightly reduced at least with respect to the distance upon reaching the end position at an end of a maximum stretching step.

3. The device according to claim 1, wherein the oven arrangement is part of at least two oven arrangements, wherein each oven arrangement includes the upper oven and the lower oven and for each oven arrangement the upper oven is provided above and the lower oven is provided beneath a travel path of the stretching frame.

4. The device according to claim 1, wherein the oven arrangement is respectively formed so that it is heated at a temperature of 300° C. +/− less than 50° C.

5. The device according to claim 1, wherein
the device is constructed such that in addition to the starting position at the beginning of a stretching process and the end position after performing the stretching process, the guide rails and thus the clips thereon are additionally movable into a loading position, and
the loading position is arranged so that it lies asymmetrically within the stretching frame and is thus at least closer to one longitudinal side of the stretching frame than to an opposite longitudinal side of the stretching frame.

6. The device according to claim 5, wherein:
the device is constructed such that at least the two first guide rails or at least the two second guide rails, for movement between their starting position and their end position, are not only adjustable away from each other or towards each other, but are also movable in the same direction for a transition into the loading position.

7. The device according to claim 5, wherein at least the two first guide rails or at least two second guide rails, which are not only adjustable towards each other and away from each other, but are also adjustable in the same adjustment direction, are driven and moved via separate drive and force transmission mechanisms.

8. The device according to claim 7, wherein at least the two first guide rails or at least the two second guide rails, which are only movable jointly towards or away from each other, are jointly driven and moved by a drive motor and to this end both guide rails are coupled via a common circumferential force transmission mechanism, wherein one guide rail is anchored at a lower run of the common circumferential force transmission mechanism and the other guide rail is anchored at an upper run of the common circumferential force transmission mechanism in an entrained way via a follower.

9. The device according to claim 5, wherein the starting position is arranged at the beginning of the stretching process in a centered location of the stretching frame or so close to the centered location that the stretching process includes a biaxial stretching process performed symmetrically, wherein the guide rails, which are movable away from each other during the stretching process, recede evenly from the starting position.

10. The device according to claim 5, wherein a loading area or the film portion to be moved therein, in the loading position before performing the stretching process, in a plan view onto the stretching frame, assumes a position and/or covers an area that does not overlap a surface of the film portion in the starting position or overlaps the surface only within a partial area that is less than 80% of an area of the surface of the film portion in the starting position, before carrying out the stretching process.

11. The device according to claim 5, wherein:
the clips which are movably held on the guide rails are held by a support structure,
a force-measuring device is provided between the support structure and the clip and/or on the support structure, wherein the clip is held over the support structure, and
the force-measuring device comprises a bending measuring device or a bending measuring strip or a strain gauge or an optical waveguide.

12. The device according to claim 11, wherein the force-measuring device extends in parallel to an adjustment plane of the guide rails and/or in parallel to a clamping plane, in which the film portion to be stretched is clamped, or deviates by an angle of less than 45° from this from the adjustment and/or clamping plane.

13. The device according to claim 5, wherein:
the device comprises a loading and unloading zone in which the stretching frame is positioned at least when the guide rails are in the loading position and/or an unloading position,
in addition to the loading and unloading zone, the oven arrangement is provided, and
the oven arrangement comprises the upper oven and the lower oven, wherein between the lower side of the upper oven and the upper side of the lower oven a spacing is formed, which is large enough that the stretching frame is movable in the spacing into the oven arrangement.

* * * * *